(12) United States Patent
Bhandari et al.

(10) Patent No.: US 7,185,216 B1
(45) Date of Patent: Feb. 27, 2007

(54) SYSTEM FOR SYNCHRONIZING FIRST AND SECOND SECTIONS OF DATA TO OPPOSING POLARITY EDGES OF A CLOCK

(75) Inventors: Nitin Bhandari, Mountain View, CA (US); Erik R. Swenson, San Jose, CA (US); Christopher J. Young, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 436 days.

(21) Appl. No.: 10/655,742

(22) Filed: Sep. 4, 2003

(51) Int. Cl.
*G06F 1/12* (2006.01)

(52) U.S. Cl. .................. 713/400; 710/61; 327/141
(58) Field of Classification Search .............. 713/400; 710/61; 327/141
See application file for complete search history.

(56) References Cited

U.S. PATENT DOCUMENTS

| | | | |
|---|---|---|---|
| 5,754,833 A * | 5/1998 | Singh et al. | 713/400 |
| 5,860,128 A * | 1/1999 | Murdoch et al. | 711/167 |
| 6,222,767 B1 * | 4/2001 | Kendall et al. | 365/185.12 |
| 6,731,148 B2 * | 5/2004 | Lau et al. | 327/158 |
| 2004/0044492 A1 * | 3/2004 | Ichikawa | 702/118 |

OTHER PUBLICATIONS

Dhir, A. and Rangasayee, K., , "*Spartan-II Famil as a Memory Controller for QDR-SRAMs*," Xilinx, Inc. WP111, v1.0, Feb. 16, 2000, available at http://www.xilinx.com/products/xaw/qdr/wpqdr.pdf.

(Continued)

*Primary Examiner*—Chun Cao
*Assistant Examiner*—Sean Weinman
(74) *Attorney, Agent, or Firm*—Howrey LLP

(57) ABSTRACT

Systems of and methods for processing data for communication between a sender and a receiver are described. In one embodiment, the phase of a first clock is used to select between first and second portions of data from the sender. The selected data is then synchronized, for communication to the receiver, to a second clock having a frequency which is an integer multiple of that of the first clock, wherein the integer multiple is two or more. The first and second portions of the data may be provided to the same output pins in this embodiment for communication to the receiver. In a second embodiment, first and second portions of data from the sender are clocked in using first and second edges, respectively, of a first clock. The first and second edges have a first polarity if a first pre-determined mode is in effect, and have a second polarity if a second pre-determined mode is in effect. Data derived from the clocked in data is then synchronized, for communication to the receiver, to a second clock. In a third embodiment, data from the sender is clocked in using a first clock. The clocked in data is then transformed responsive to a pre-determined mode selected from a plurality of possible modes. The transformed data is then synchronized, for communication to the receiver, to a second clock. In a fourth embodiment, a first clock is provided which is delayed relative to a second clock by a pre-determined amount. Data is then clocked out for communication to a receiver using the second clock, and clocked in for communication back to the sender using a third clock derived from the second clock. Data derived from the clocked in data is then synchronized to the first clock.

63 Claims, 27 Drawing Sheets

OTHER PUBLICATIONS

Micron Technology, Inc., "*QDR™ SRAM Design Guide*," Technical Note TN-54-01, Apr. 2001, available at http://download.micron.com/pdf/technotes/TN5401_2.pdf.

Cypress Semiconductor Corp., "*Interfacing the QDR™ with Altera APEX20KE*," Mar. 12, 2001, available at http://www.qdsram.com/technotes/cypress/altera.pdf.

Micron Technology, Inc., "*QDR™ II and DDRII SRAM Clocking Strategies*," Technical Note TN-54-02, Oct. 2001, available at http://download.micron.com/pdf/technotes/tn5402.pdf.

Cypress Semiconductor Corp., "*QDR™ II SRAM: A Design Guide*," Jun. 12, 2002, available at http://www.qdsram.com/technotes/cypress/QDR2_design.pdf.

* cited by examiner

| MODE [14] | CLOCK INVERSION |
|---|---|
| 0 | CLOCKS NOT INVERTED |
| 1 | CLOCKS INVERTED |

| MODE [12:10] | QDR - II ADDRESS CONFIGURATIONS |
|---|---|
| 000 | NO BANKING |
| 001 | 128K ADDRESSES |
| 010 | 256K ADDRESSES |
| 011 | 512K ADDRESSES |
| 100 | 1M ADDRESSES |
| 101 | NO BANKING |
| 110 | NO BANKING |
| 111 | NO BANKING |

| MODE [9] | CLOCK "C" OUTPUT ENABLE |
|---|---|
| 0 | NO CLOCK C OUTPUT |
| 1 | CLOCK C OUTPUT |

| MODE [8] | AUTO PHASE LOCK MODES |
|---|---|
| 0 | AUTO PHASE LOCK DISABLED |
| 1 | AUTO PHASE LOCK ENABLED |

| MODE [7] | SYSCLK PHASE |
|---|---|
| 0 | NON-INVERTED SYSCLK PHASE |
| 1 | INVERT SYSCLK PHASE |

| MODE [6] | COUT |
|---|---|
| 0 | NON-INVERTED C |
| 1 | INVERT C |

| MODE [5] | KOUT |
|---|---|
| 0 | NON-INVERTED K |
| 1 | INVERT K |

| MODE [4] | READ DATA HI/LO SWAP |
|---|---|
| 0 | NO SWAP OF HI/LO READ DATA |
| 1 | SWAP HI/LO READ DATA |

| MODE [13] | MODE [3] | READ DATA LO LATENCY |
|---|---|---|
| 0 | 0 | 6 CYCLE LATENCY READ DATA LO |
| 0 | 1 | 5 CYCLE LATENCY READ DATA LO |
| 1 | 0 | 5 CYCLE LATENCY READ DATA LO |
| 1 | 1 | 4 CYCLE LATENCY READ DATA LO |

| MODE [2] | READ DATA HI LATENCY |
|---|---|
| 0 | 6 CYCLE LATENCY READ DATA HI |
| 1 | 5 CYCLE LATENCY READ DATA HI |

| MODE [1:0] | ECHO CLOCK READ DATA SYNCHRONIZATION MODES |
|---|---|
| 01 | READ DATA SYNCHRONIZED TO CQ |
| 10 | READ DATA SYNCHRONIZED TO CQ/ |

FIG. 24

SYSTEM FOR SYNCHRONIZING FIRST AND SECOND SECTIONS OF DATA TO OPPOSING POLARITY EDGES OF A CLOCK

1. FIELD OF THE INVENTION

This invention relates to the field of data interfacing, and, more specifically, to a data interface providing for the communication of source synchronous data between a sender and a receiver of such data.

2. RELATED ART

Source synchronous data is data which is transmitted in conjunction with a clock to which it is synchronized. FIG. 1 illustrates source synchronous data 106 communicated between a sender 102 and a receiver 104 of the data. As illustrated, the data is accompanied by a clock 108 to which it is synchronized.

The data may be uni-directional or it may be bi-directional. FIG. 1 illustrates uni-directional communication of source synchronous data. FIG. 2 illustrates bi-directional communication of source synchronous data between sender/receiver 202 and sender/receiver 204. The data from sender/receiver 202 to sender/receiver 204 is identified with numeral 206 and is accompanied by clock 208. The data from sender/receiver 204 to sender/receiver 202 is identified with numeral 210 and is accompanied by clock 212.

Similarly, the data and/or clock lines for carrying the data and/or clocks between the sender and receiver may be uni-directional or bi-directional. FIGS. 1 and 2 illustrate uni-directional data and clock lines, but it should be appreciated that either or both of these data and/or clock lines may be bi-directional.

The data may be single data rate, i.e., synchronized to one or the other of the rising or falling edges of the clock but not both, or the data may be double data rate, i.e., synchronized to both edges of the clock. The advantage of the double data rate (DDR) format over the single data rate format is that it offers twice the throughput.

If the senders and receivers of the data can communicate source synchronous data over multiple independent ports, the throughput can be increased even more. For example, in FIG. 2, assuming ports 214 and 216 within sender/receiver 202 are independent, and ports 218 and 220 within sender/receiver 204 are independent, then the data 206 can be communicated completely independently of data 210. If both data streams are DDR data streams, then four data items can be communicated between the two in a single clock cycle. This mode of transmission is often referred to as a quad data rate (QDR®) mode or format. (The term QDR® is a registered trademark in the field of semiconductor devices that is owned by Cypress Semiconductor, Corp.).

The QDR® mode or format is emerging as an attractive mode for communicating data at high throughputs between a host and a device. In fact, a consortium of companies has formed to develop a family of SRAM products which are compatible with the QDR® format. Similarly, a forum has emerged to address the development of network processors which are compatible with the QDR® format.

FIG. 3 illustrates the communication of QDR® data between ASIC 302 and QDR® SRAM 304. The ASIC 302 communicates DDR source synchronous data 306 to SRAM 304 accompanied by clock 308. The data 306 comprises three categories of data: (1) write data; (2) read or write address data; and (3) control data, e.g., read or write strobe data. The clock 308 may be referred to as the write clock.

The SRAM 304 communicates DDR source synchronous data 310 to ASIC 302 accompanied by clock 314. The clock 314 may be an echo of the write clock 308, and thus may be referred to as the echo clock. The data 310 comprises read data which may be synchronized to the echo clock 314. Alternatively, or in addition, the data 310 may be synchronized to a read clock 312 communicated from the ASIC 302 to the SRAM 304.

The DDR write data 306 is received by SRAM 304 over port 316. The DDR read data 310 is transmitted by SRAM 304 over port 318. The two ports 316, 318 are independent, allowing data to be communicated between the two devices in the QDR® format.

One challenge which is encountered when attempting to communicate DDR or QDR® data between a sender and receiver of such data is synchronizing the data on both edges of the clock when many edge-triggered devices useful for synchronization, such as flip flops and the like, only transition on one or the other but not both of the rising or falling edges of the clock. The problem is compounded because the use of edge-triggered devices of both polarities may not always be possible, and the asymmetry typically exhibited between the positive and negative portions of the clock may further limit the approaches available.

Another challenge is achieving compatibility with the different senders and receivers of data that may be encountered. For example, in FIG. 3, one SRAM may provide a high portion of the read data 310 on the falling edge of the read clock 312 and a low portion of the read data 310 on the rising edge of the read clock 312. However, another SRAM may provide the low portion of the read data 310 on the falling edge of the read clock 312 and the high portion of the read data 310 in the rising edge of the read clock 312.

Another challenge is providing an interface which has the flexibility to handle unexpected circuit board layout constraints which are ever increasing due to increasing complexity and higher operating frequencies. During the circuit board design process, if the interface is inflexible, and an unexpected circuit board layout constraint is encountered which cannot be accommodated by the interface, either the circuit board layout or the interface may need to be retooled, potentially wasting months of valuable design time.

SUMMARY

In a first aspect of this disclosure, a system for processing data for communication between a sender and a receiver is described. In this system, first logic selects a first portion of data from the sender if the phase of the first clock has a first polarity and selects a second portion of data from the sender if the phase of the first clock has a second polarity. Third logic synchronizes, for communication to the receiver, the selected data from the second logic to a second clock having a frequency which is an integer multiple of that of the first clock, wherein the integer multiple is two or more. In one embodiment, the second clock has a frequency which is twice that of the first clock.

In a second aspect of this disclosure, a second system for processing data for communication between a sender and receiver is described. In this system, first logic clocks in first and second portions of data from the sender using first and second edges, respectively, of a first clock. The first and second edges have a first polarity if a first pre-determined mode is in effect, and have a second polarity if a second pre-determined mode is in effect. Second logic synchronizes, for communication to the receiver, data derived from the clocked in data to a second clock.

In one embodiment, the first clock is a differential mode signal having first and second portions of opposing polarity. In this embodiment, if the first pre-determined mode is in effect, the first edge is from the first portion of the differential mode signal, and the second edge is from the second portion of the differential mode signal. If the second pre-determined mode is in effect, the first edge is from the second portion of the differential mode signal, and the second edge is from the first portion of the differential mode signal.

In a third aspect of this disclosure, a third system for processing data for communication between a sender and receiver is described. In this system, first logic clocks in data from the sender using a first clock. Second logic transforms at least a portion of the clocked in data responsive to a pre-determined mode selected from a plurality of possible modes. Third logic synchronizes, for communication to the receiver, at least a portion of the transformed data to a second clock.

In one example, the clocked in data comprises first and second portions, and the second logic swaps the first and second portions responsive to the pre-determined mode. In a second example, the clocked in data again comprises first and second portions, and the second logic varies the latency of the first and second portions responsive to the pre-selected mode. In one implementation of this example, the latencies of the first and second portions may be independently varied responsive to the pre-determined mode.

In a fourth aspect of this disclosure, a fourth system for processing data for communication between a sender and receiver is described. In this system, first logic provides a first clock and a second clock, wherein the first clock is delayed relative to a second clock by a pre-determined amount. Second logic synchronizes, for communication to the receiver, data from the sender to the second clock. Third logic clocks in, using a third clock derived from the second clock, data from the receiver. Fourth logic synchronizes, for communication to the sender, data derived from the clocked in data to the first clock.

Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 24 is a table explaining the functions of fifteen mode bits, mode [0], . . . , mode [14], in the example implementation of FIGS. 23A, 23B, 23C, and 23D.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations in hardware, software, or combinations of hardware and software.

The term "port" refers to any point of ingress or egress to or from a sender or receiver of data.

Figure 1:
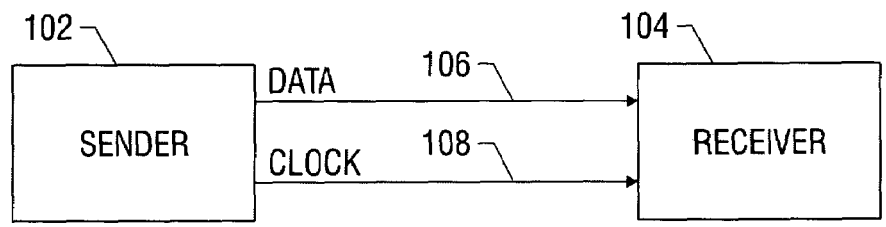
FIG. 1 is a block diagram illustrating the communication of source synchronous data between a sender and a receiver.
Figure 2:
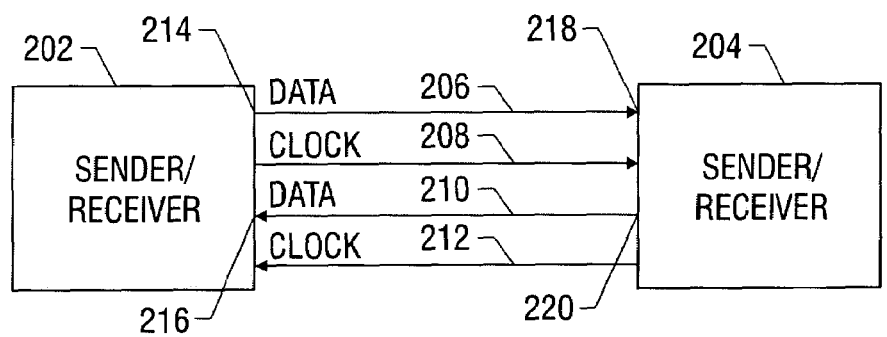
FIG. 2 is a block diagram illustrating the bi-directional communication of source synchronous data between a sender and a receiver.
Figure 3:
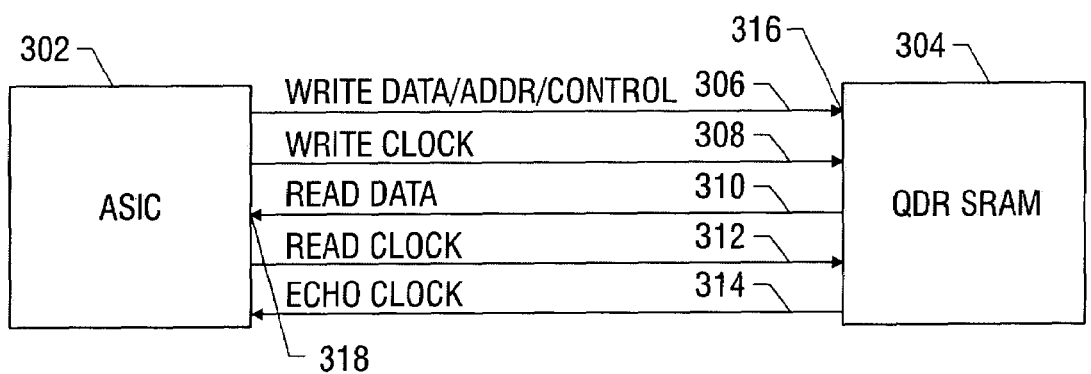
FIG. 3 is a block diagram illustrating the bi-directional communication of QDR® data between an ASIC and a QDR® SRAM.
Figure 4A:
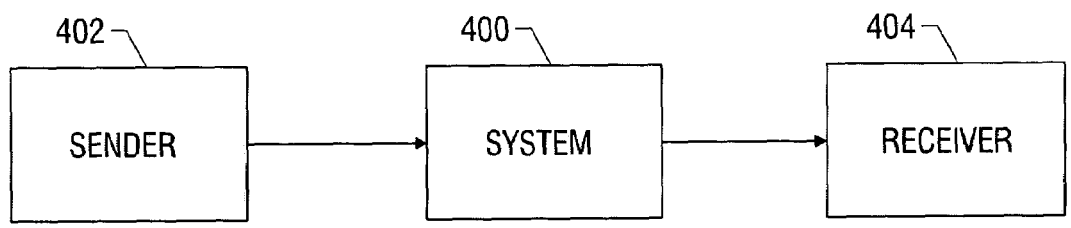
FIG. 4A is a block diagram of a system for processing data for communication between a sender and a receiver.

FIG. 4A is a block diagram illustrating a system 400 for processing data for communication between a sender 402 and a receiver 404. In FIG. 4A, data flows from the sender 402, through the system 400, and to the receiver 404.

Figure 4B:
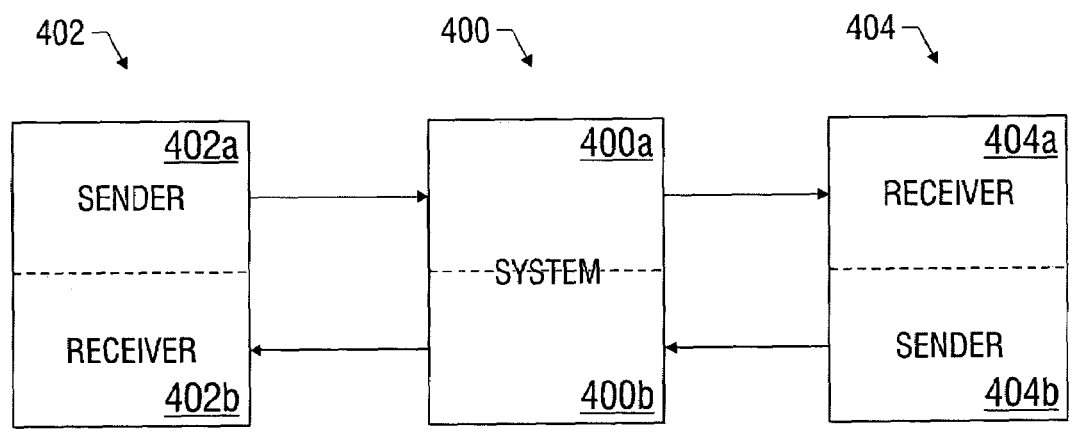
FIG. 4B is a block diagram of a system for processing data for bi-directional communication between a first sender/receiver and a second sender/receiver.

FIG. 4B is a block diagram of an embodiment of system 400 configured to handle a bi-directional flow of data. In this embodiment, the entity 402 comprises a sender 402a and a receiver 402b. Similarly, entity 404 comprises a receiver 404a and a sender 404b. In this embodiment, data flows from sender 402a, through system 400, and to receiver 404a. In addition, data flows from sender 404b, through system 400, and to receiver 402b. In this embodiment, system 400 comprises two portions, identified with numerals 400a and 400b. The portion identified with numeral 400a handles data communicated from sender 402a to receiver 404a. The portion identified with numeral 400b handles data communicated from sender 404b to receiver 402b. Each of the portions 400a, 400b may comprise the same or different embodiments of the system 400 illustrated in FIG. 4A.

Figure 5:
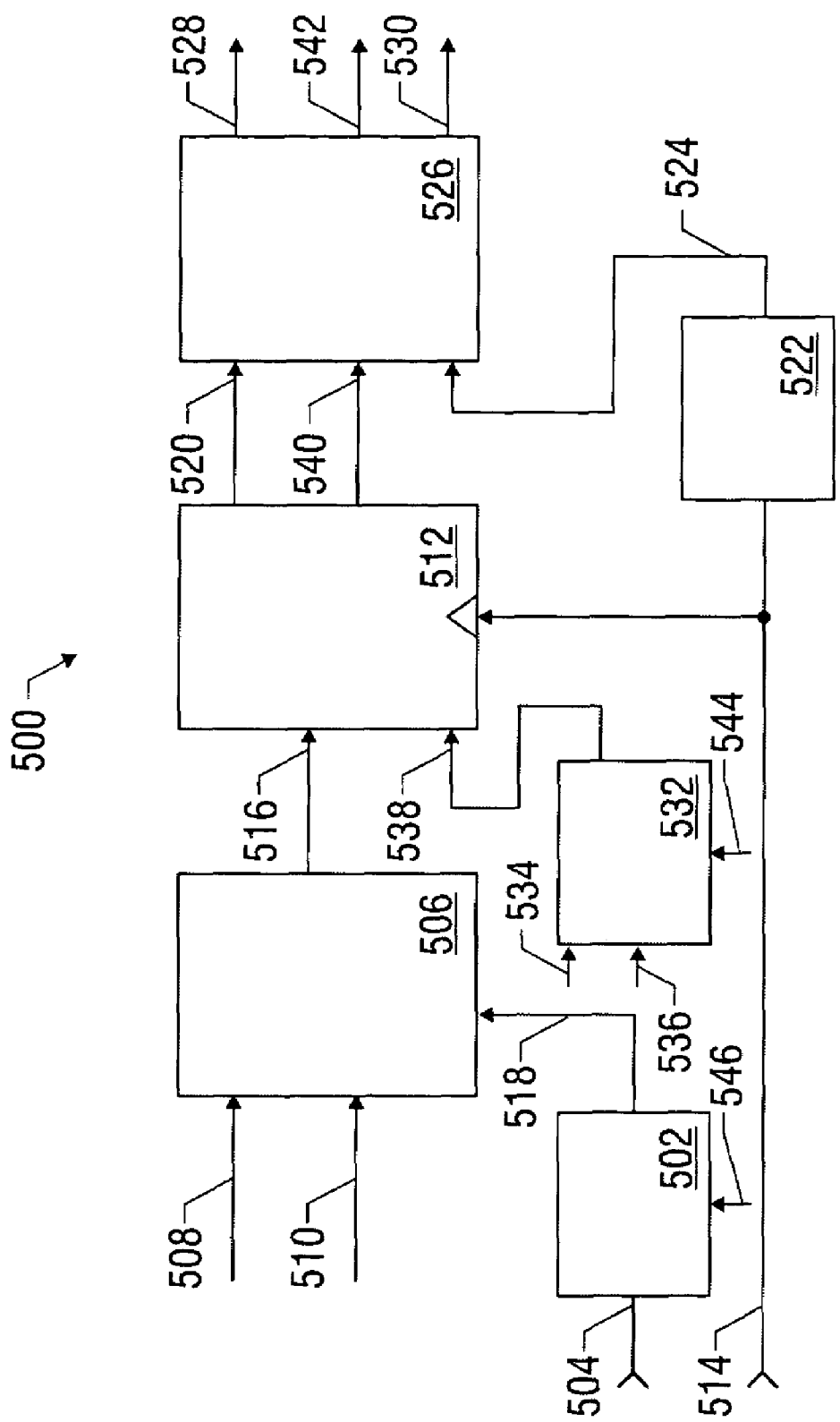
FIG. 5 is a block diagram of a system for selecting between first and second portions of data from a sender responsive to a detected phase of a first clock, and then synchronizing the selected data to a second clock having a frequency which is an integer multiple of that of the first clock.

FIG. 5 illustrates an embodiment 500 of the system 400. As illustrated, in this embodiment, the system comprises first logic 502 for detecting the phase of a first clock 504. Second logic 506 selects between a first portion 508 and a second portion 510 of data from the sender responsive to the detected phase 518 of the first clock 504. If the detected phase of the first clock 504 has a first polarity, the second logic 506 selects the first portion 508 of the data. If the detected phase of the first clock 504 has a second polarity, the second logic 506 selects the second portion 510 of the data. Third logic 512 synchronizes, for communication to the receiver, the selected data 516 to a second clock 514 having a frequency which is an integer multiple of that of the first clock, wherein the integer multiple is two or more.

In this particular embodiment, first logic 502 is provided for detecting the phase of the first clock 504, but it should be appreciated that embodiments are possible where the phase of the first clock is known through other means, and that in these embodiments, the first logic 502 can be avoided.

In one implementation, the frequency of the second clock 514 is an even integer multiple of that of the first clock. In another implementation, the frequency of this second clock 514 is an odd integer multiple of that of the first clock.

In one embodiment, the third logic 512 outputs, for communication to the receiver, the first and second portions of the data on successive edges of the second clock 514 having like polarity. In one implementation, the third logic 512 outputs the first and second portions of the data to the same signal lines or pins 520.

Figure 6:
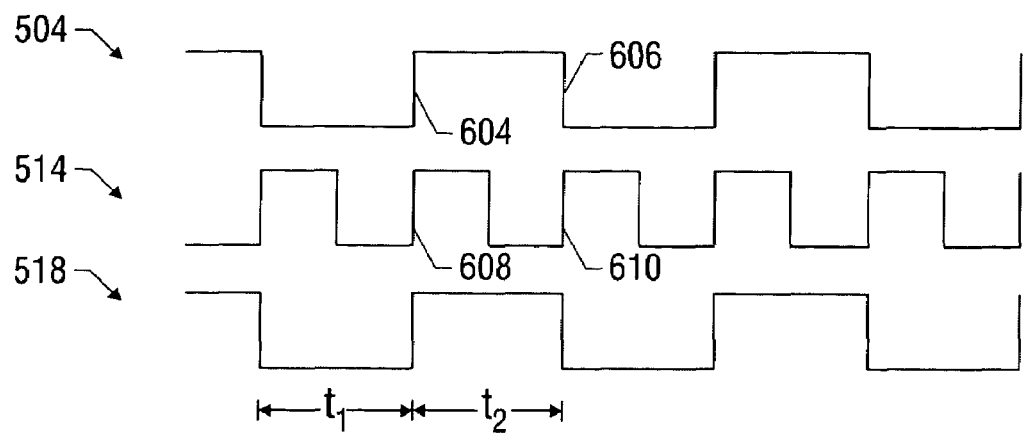
FIG. 6 is an example of waveforms showing the relationship between the detected phase and the first and second clocks in the system of FIG. 5.

FIG. 6 illustrates an implementation in which the second clock 514 has a frequency which is twice that of the first clock 504. As illustrated, in this implementation, the first and second clocks are maintained in a phase locked relationship to one another. The detected phase 518 from the first logic 502 indicates the polarity of the phase of the first clock 504. For example, during time $t_1$, the detected phase 518 is low because the polarity of the phase of the first clock 504 is low during this time period. As another example, during time $t_2$, the detected phase 518 is high because the polarity of the phase of the first clock 504 is high during this time.

The detected phase 518 provides an indication of the polarity of the next transition of the first clock 504. In FIG. 6, during time $t_1$, the low state of the detected phase 518 indicates that the next transition 604 of the first clock will be a positive transition. Similarly, during $t_2$, the high state of the detected phase 518 indicates that the next transition 606 of the first clock 504 will be a negative transition.

In FIG. 5, when the phase detected 518 is in a first state, the first portion of the data from the sender is selected by the second logic 506, and when the detected phase 518 is in a second state, the second portion of the data from the sender is selected by the second logic 506. Assuming the third logic 512 is positive edge triggered, the third logic 512 synchronizes the selected data, for communication to the receiver, to the next rising edge of the second clock 514.

Thus, in FIG. 6, the first portion of the data, selected during time $t_1$ when the detected phase 518 is low, is output by the third logic 512 on the rising edge 608 of the second clock 514, and the second portion of the data, selected during time $t_2$ when the detected phase 518 is high, is output by the third logic on the rising edge 610 of the second clock 514. The rising edge 608 of the second clock 514 corresponds to the rising edge 604 of the first clock 504, and the rising edge 610 of the second clock 514 corresponds to the falling edge 606 of the first clock 504. The result is that the first and second portions of the data are output by the third logic 512 synchronized, respectively, to successive rising and falling edges of the first clock 504 even though only positive edge triggered logic is used in this implementation.

Referring back to FIG. 5, in one embodiment, the system 500 further comprises fourth logic 522 for deriving, responsive to the second clock 514, a third clock 524 having a frequency equal to that of the first clock 504. In one implementation, in which the second clock 514 has a frequency twice that of the first clock 504, the fourth logic 522 functions, at least in part, by halving the frequency of the second 514 to achieve the frequency of the third clock 524.

In one embodiment, the system 500 further comprises fifth logic 526 for communicating source synchronous data to the receiver. In one example, this data comprises the data 520 from the third logic 512 accompanied by the third clock 524. In one implementation, this fifth logic 526 comprises drivers for the data 520 and the clock 524, and signal lines in the forms of traces for communicating this information to the receiver as source synchronous data 528 accompanied by a clock 530 to which the data is synchronized. The traces in this implementation for the clock 530 may be extended in relation to those for the data 528 so that the transitions of the clock 530 are centered within windows of time in which the data 528 is valid. The windows are large enough so that the portion of time from the beginning of the window to the transition equals or exceeds the required setup time, and the portion of time from the transition to the end of the window equals or exceed the required hold time.

This fifth logic 526 is shown to the right of the circuitry depicted in FIG. 5, but it should be appreciated that this circuitry, if present, may be situated to the left of this circuitry or both to the right and left of this circuitry.

In one embodiment, the system 500 further comprises sixth logic 532 for logically combining third and fourth portions 534, 536 of data from the sender responsive to a pre-determined mode 544 selected from a plurality of possible modes, and the third logic 512 synchronizes the logically combined data 538, for communication to the receiver over signal lines or pins 540 (and signal lines 542), using the second clock 514.

In one implementation, the receiver is a memory within a memory configuration having a depth, and one or the other of the third and fourth portions 534, 536 of data from the sender is address data, and the other is strobe data. In this implementation, the pre-determined mode is an indicator of the depth of the memory configuration. The sixth logic 532 selectively allows passage of the strobe signal to the memory based on the address data and the depth of the memory configuration.

In one embodiment, the first logic 502 is configured to switch between detecting first and second polarities of the phase of the first clock responsive to a pre-determined mode 546 selected from a plurality of possible modes. In one implementation, if a first mode is selected, the detected phase 518 is high if the next transition of the first clock 504 is a rising edge, and is low if the next transition is a falling edge. In this implementation, if a second mode is selected, the detected phase 518 is high if the next transition of the first clock 504 is a falling edge, and is low if the next transition of the first clock 504 is a rising edge.

Figure 7:
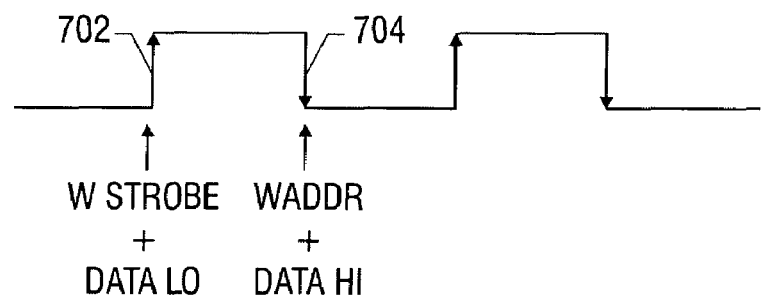
FIG. 7 is an example of the timing sequence for a write operation for a QDR® SRAM.

In one implementation, the receiver is an SRAM which expects write strobe data, write data, and write address data from the sender to be synchronized to the third clock 524 in the manner illustrated in FIG. 7. On the rising edge 702 of the third clock 524, the write strobe data, and the low portion of the write data are provided. On the falling edge 704 of the third clock 524, the write address data and the high portion of the write data are provided.

Figure 8:
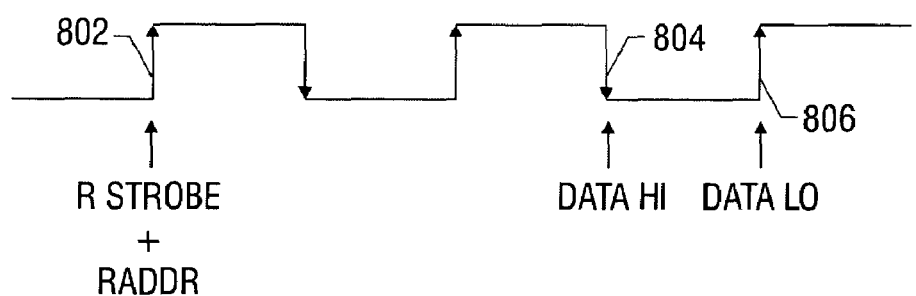
FIG. 8 is an example of the timing sequence for a read operation for a QDR® SRAM.

In this implementation, the SRAM expects read strobe data and read address data from the sender to be synchronized to the third clock 524 (or a clock derived from the third clock) in the manner illustrated in FIG. 8. On the rising edge 802 of the third clock 524, the read strobe data and the read address data are provided. In response, the SRAM in this implementation provides the high portion of the read data on the falling edge 804 which is 1½ clock periods after the rising edge 802, and provides the low portion of the read data on the next rising edge 806.

Figure 9:
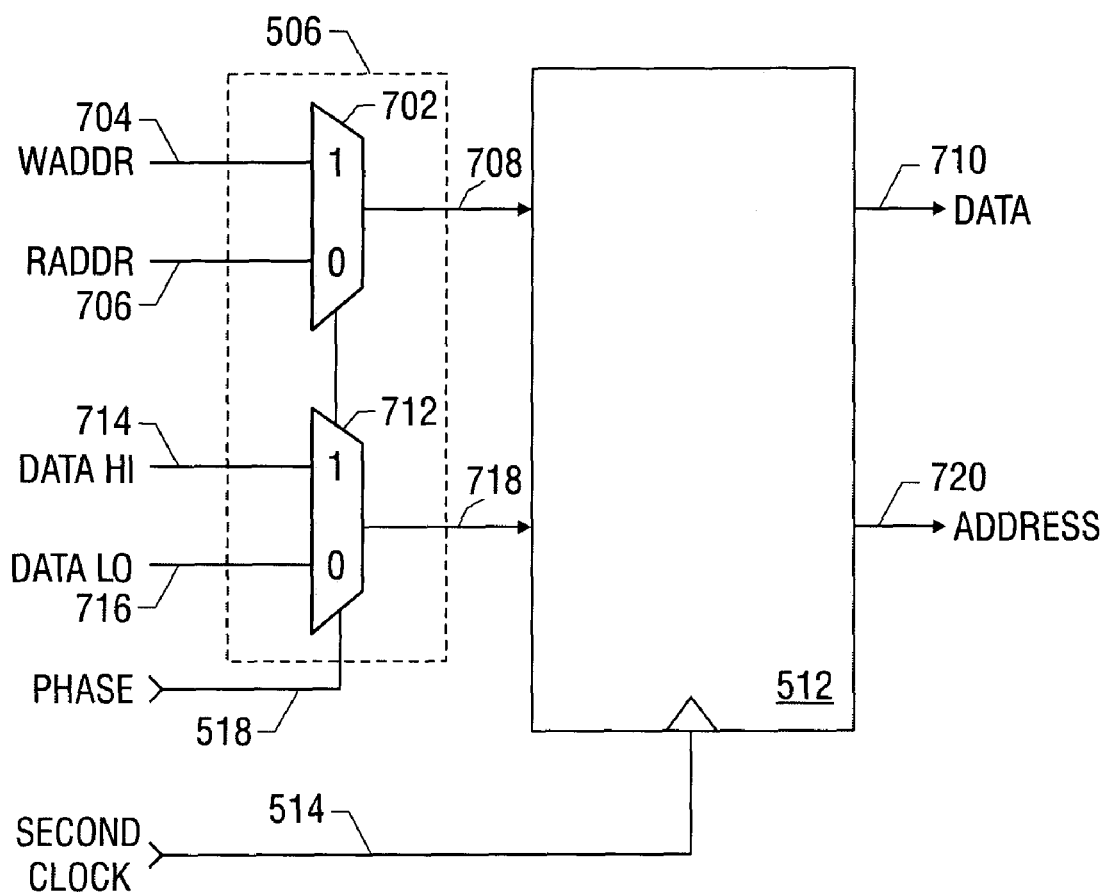
FIG. 9 is a block diagram showing one implementation of the selection logic in the system of FIG. 5.

FIG. 9 illustrates an implementation of the second logic 506 and the third logic 512 configured to achieve these timing sequences. The second logic 506 in this implementation comprises multiplexors 702 and 712. The select signal to both multiplexors is the detected phase 518 of the first clock 504. The inputs to multiplexor 702 comprise write address data 704 and read address data 706. The inputs to multiplexor 712 comprise the high portion 714 and the low portion 716 of the write data. When the detected phase 518 is low, the selected data 708 from the multiplexor 702 is the read address data 706, and the selected data 718 from multiplexor 712 is the low portion 716 of the write data. When the detected phase 518 is high, the selected data 708 from the multiplexor 702 is the write address data 704, and the selected data 718 from the multiplexor 712 is the high portion 714 of the write data.

The second clock 514 in this implementation has a frequency twice that of the first clock 504 and is assumed to have a phase locked relationship with the first clock 504. The third logic 512 in this implementation is assumed to be a rising edge triggered device or devices, such as a plurality of D-type rising edge triggered flip flops. The third logic 512 in this implementation outputs the selected data 708 onto data signal lines 710 and the selected data 718 onto address signal lines 720 upon the next rising edge of the second clock. It also outputs the read or write strobe data (not shown), depending on whether a read or write transaction is occurring, upon the next rising edge of the second clock. Assuming the third clock is derived by simply halving the frequency of the second clock, it will be seen that the timing sequences illustrated in FIGS. 7 and 8 will be followed or accommodated by the implementation illustrated in FIG. 9.

Figures 10, 10A, 10B, 11, 12, 12A, 12B:
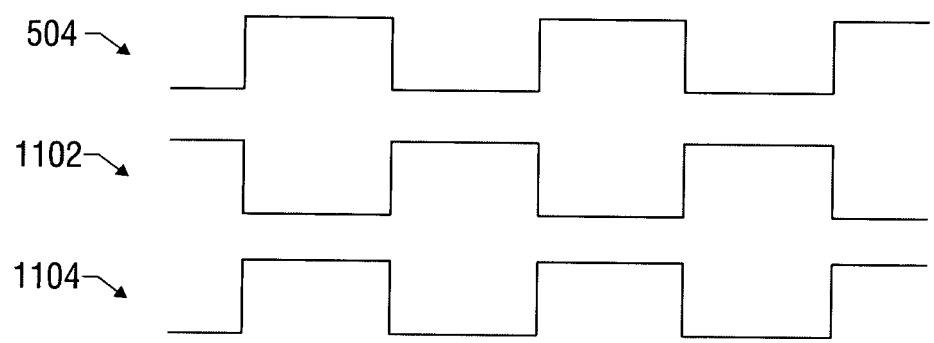
FIG. 10A shows one implementation of the phase detect logic in the system of FIG. 5.
FIG. 10B shows one implementation of showing logic for selectively enabling an automatic phase logic feature in the phase detect logic of FIG. 10A.
FIG. 11 illustrates an example of selectively inverting the polarity of the detected phase in the phase detect logic of FIG. 10A.
FIGS. 12A and 12B illustrates one implementation of circuitry for generating a third clock for communication to the receiver in the system of FIG. 5.
Figure 10A:
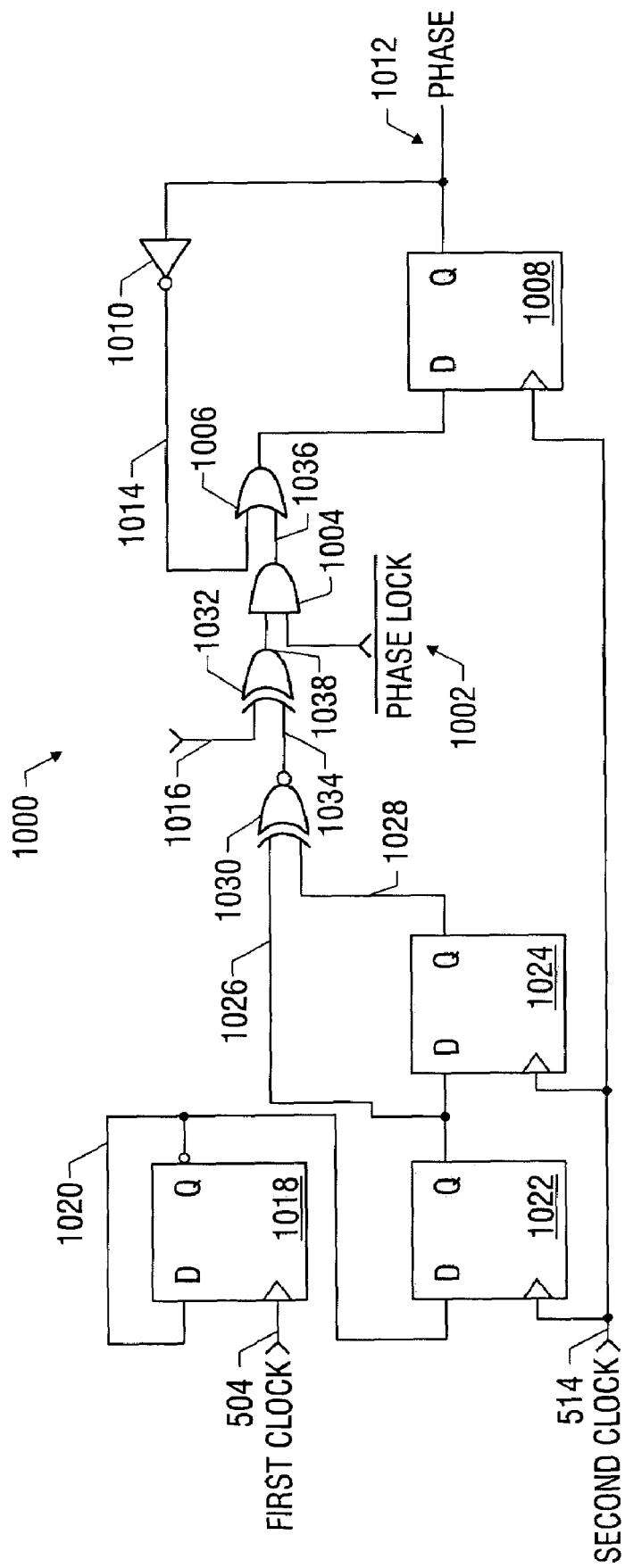
Figure 10B:
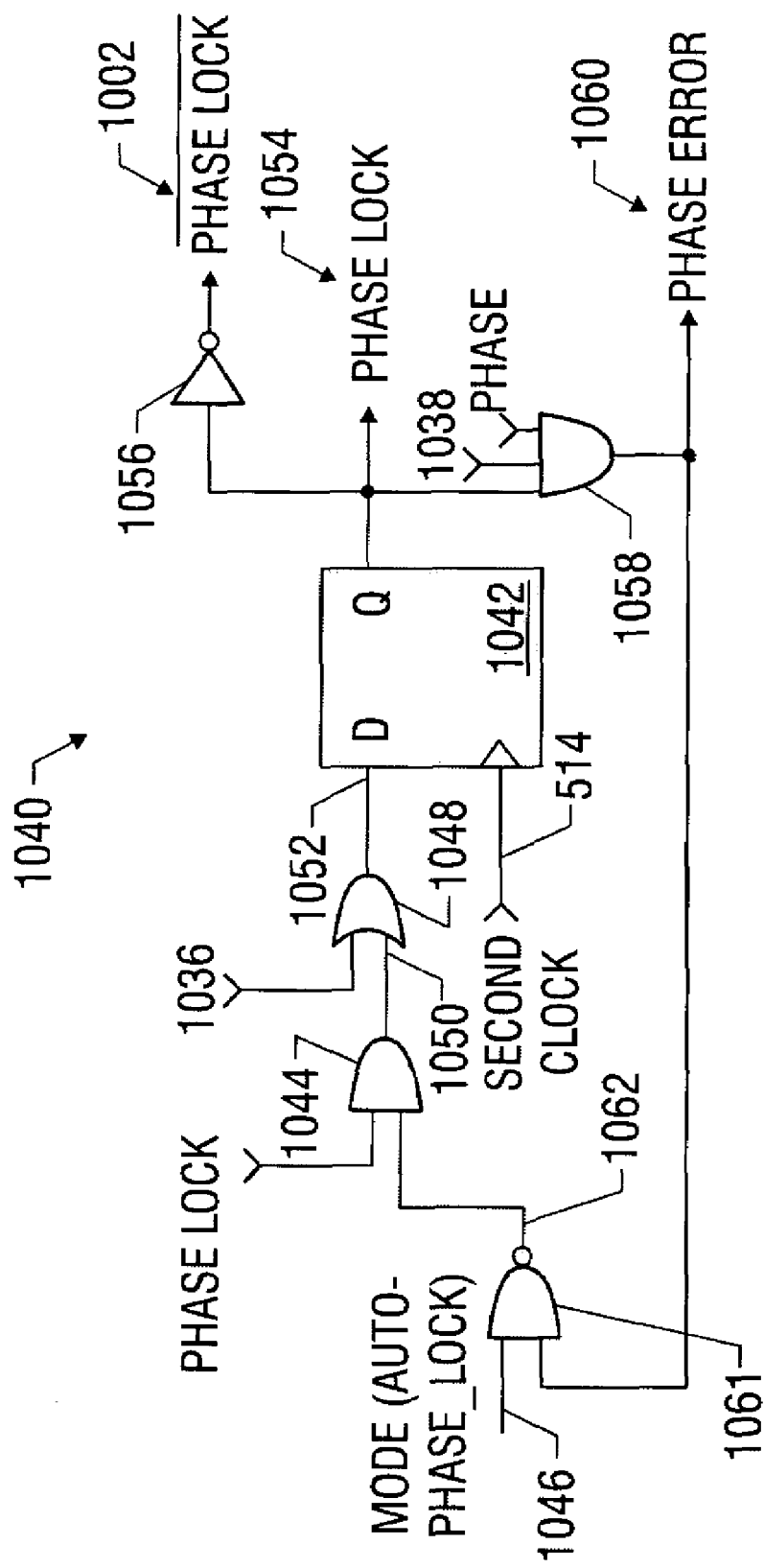
Figure 12A:
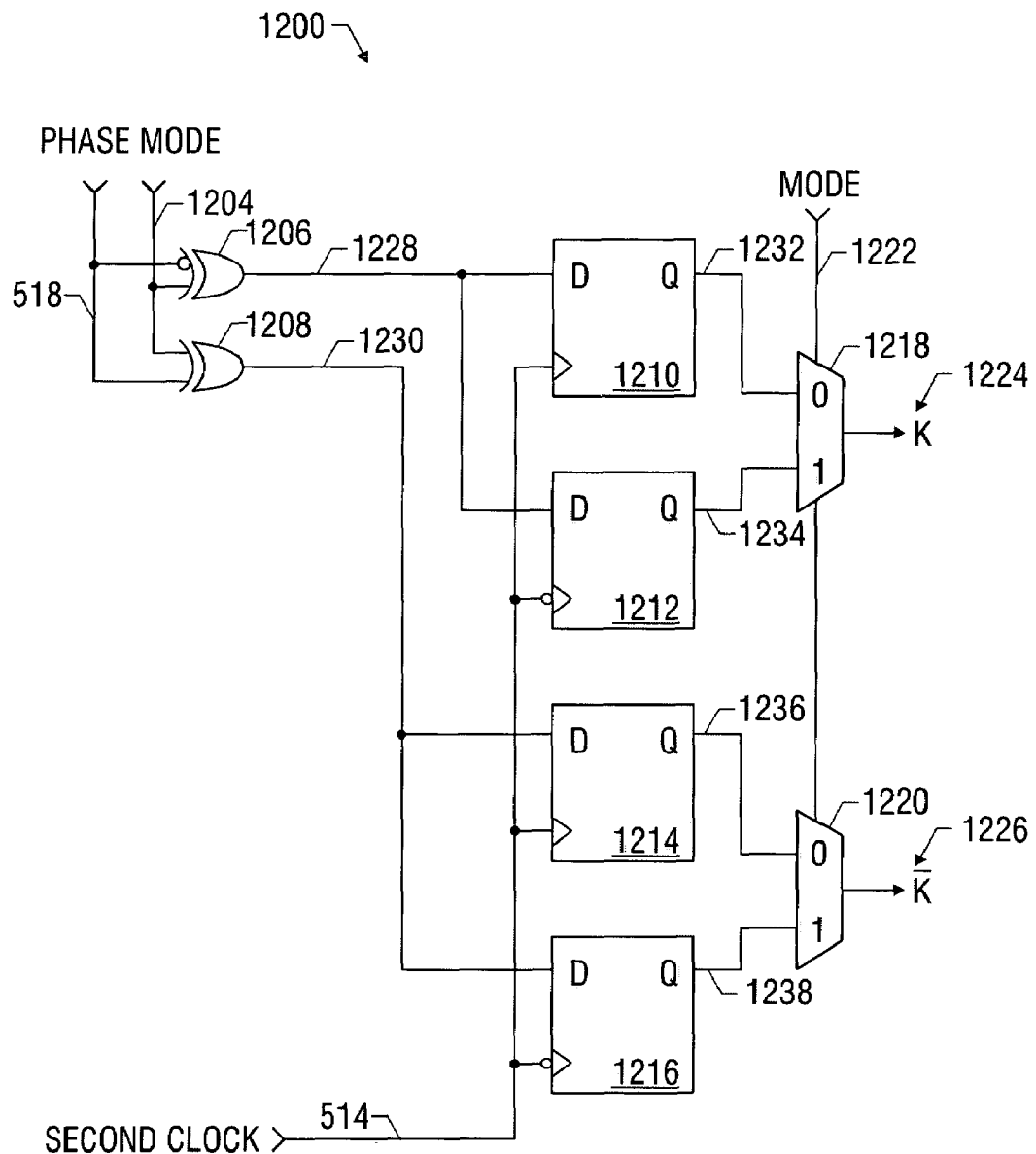
Figure 12B:
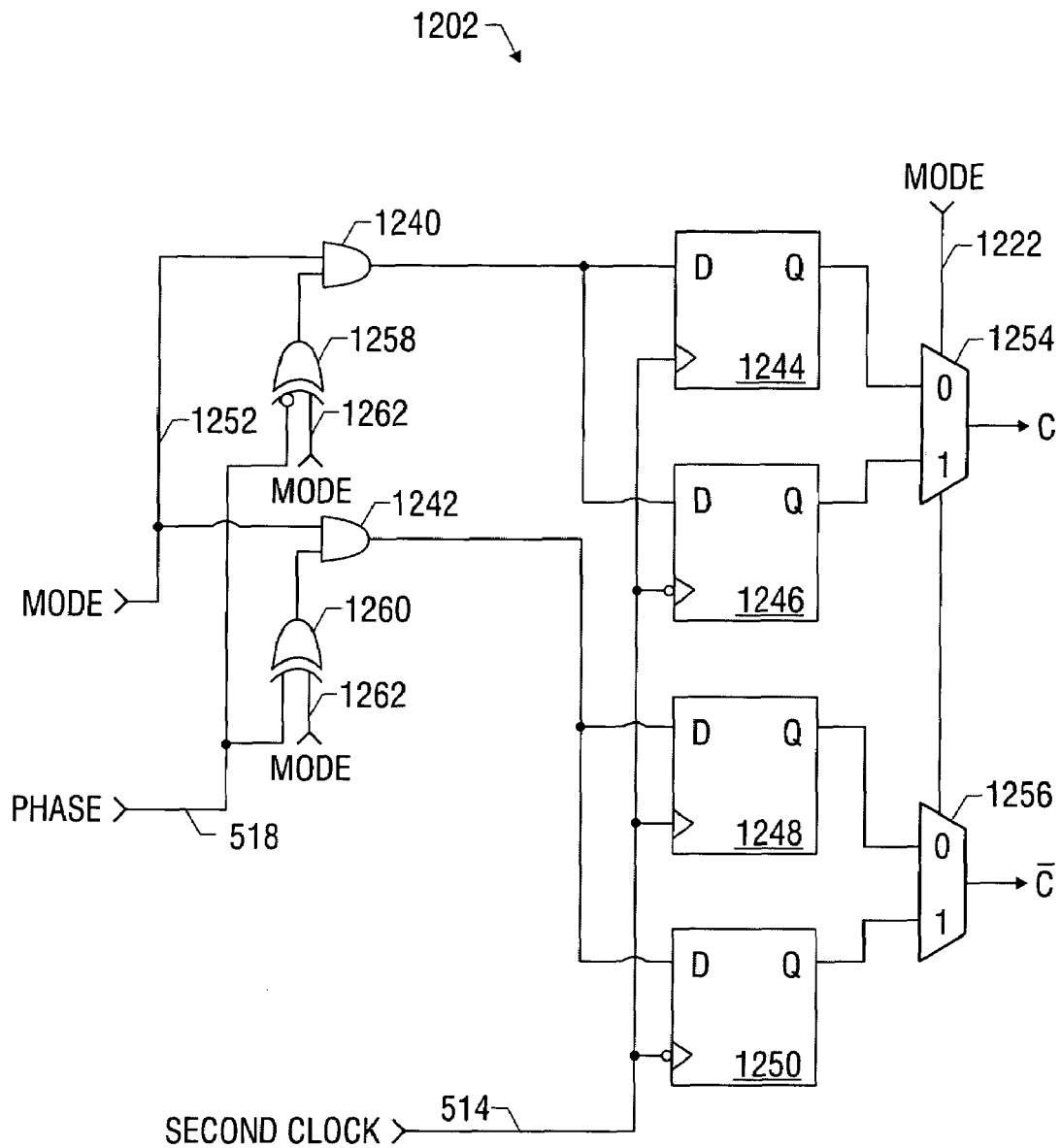

FIGS. 10A and 10B together illustrate an implementation of the first logic 502. FIG. 10A illustrates the circuitry 1000 for generating the signal PHASE, representing the detected phase of the first clock 504. In this particular implementation, the second clock 514 is assumed to have a frequency twice that of the first clock 504. The second clock 514 may be generated from the first clock 504 using a phase locked loop or other similar device. In the steady state, the first and second clocks are in a phase locked relationship. The signal PHASE LOCK/, identified with numeral 1002, indicates the status of this phase locked relationship. If asserted (low), the signal indicates the two clocks are phase locked. If high, the signal indicates the two clocks are out of a phase locked relationship. FIG. 10B illustrates the circuitry 1040 for generating the PHASE LOCK/ signal.

If the PHASE LOCK/ signal 1002 is asserted (low), the AND gate 1004 masks out everything in the circuit 1000 to the left of the AND gate. The OR gate 1006 passes through to the input of the D flip flop 1008 the negative feedback loop 1014. The negative feedback loop 1014 is the output 1012 of the flip flop 1008 after inversion by the inverter 1010. The flip flop 1008 is a rising edge triggered device, and is clocked by the second clock 514. The device 1000 simply operates in a toggling mode, whereby the state of the flip flop 1008, and the output signal 1012, the detected phase of the first clock 504, simply toggles back and forth between high and low states at successive rising edges of the second clock 514.

Before the phase locked relationship has been established between the first and second clocks, the mode signal 1016 may be used to establish the polarity of the PHASE signal 1012. If the mode signal 1016 is low, the PHASE signal 1012 is high if the next edge of the first clock 504 will be a falling edge, and is low if the next edge of the first clock will be a rising edge. If the mode signal 1016 is high, the PHASE signal is high if the next edge of the first clock 504 will be a rising edge, and is low if the next edge of the first clock 504 will be a falling edge. The situation is illustrated in FIG. 11. The waveform 504 is the first clock. The waveform 1102 is the PHASE signal 1012 assuming the mode signal 1016 is high. The waveform 1104 is the PHASE signal 1012 assuming the mode signal 1016 is low.

Upon power up, each of the flip flops 1008, 1018, 1022, and 1024 is reset into the low state. Before the phase locked relationship has been established between the first and second clocks, the PHASE LOCK/ signal 1002 is high, and the operation of the circuit 1000 to the left of the AND gate 1004 is relevant. The inverted output of the D-type flip flop 1018 is fed back to its input though negative feedback loop 1020. Accordingly, the flip flop 1018 simply toggles back and forth between high and low states at successive rising edges of the first clock 504.

The inverted output of flip flop 1018 is input to flip flop 1022, which is clocked by second clock 514. The transitions on the output of the flip flop 1022 thus represent positive going transitions of the first clock 504 but in the second clock domain. The output of flip flop 1022 is input to flip flop 1024, which is also clocked by the second clock 514. The transitions on the output of the flip flop 1024 thus represent deferred positive transitions of the first clock 504 in the second clock domain, but deferred one cycle of the second clock 514.

The outputs 1026, 1028 of the flip flops 1022 and 1024 are input to XNOR gate 1030. The output 1034 of the XNOR gate 1030 represents the phase of the first clock 504. If the output 1034 is low, indicating that the inputs to the XNOR gate 1030 are different, the phase of the first clock 504 is negative. If the output 1034 is high, indicating that the two inputs are the same, the phase of the first clock 504 is positive.

The XOR gate 1032 selectively inverts the detected phase 1034 of the first clock 504 based on a mode bit 1016. If the mode bit 1016 is low, the phase 1034 is passed through without inversion. If the mode bit 1016 is high, the phase 1034 is passed through inverted. This feature was explained previously in relation to FIG. 11.

Before the phase locked condition has been achieved between the first and second clocks, the PHASE LOCK/ signal is high. Accordingly, the AND gate 1004 allows the detected phase of the first clock, after optional inversion through assertion of the mode bit 1016, to pass through to the OR gate 1006.

The flip flop 1008 locks in the phase of the first clock 504 on the next rising edge of the second clock 514. It thus represents the phase of the first clock 504 in the second clock domain before the phase locked condition has been established.

FIG. 10B illustrates one implementation of the circuitry 1040 for generating the PHASE LOCK/ signal (and its complement, PHASE LOCK). The mode bit 1046 controls whether an automatic phase lock mode is enabled or disabled. When the bit is low, the automatic mode is disabled, and when the bit is high, the automatic mode is enabled.

Assuming the mode is disabled, the output 1067 of the NAND gate 1061 is held high, and the output 1052 of the OR gate 1048 (which forms the input to the flip flop 1042) is simply the detected phase of the first clock 504 in the domain of the second clock 514 before phase lock has been achieved. This detected phase is taken from the output 1036 of AND gate 1004.

The PHASE LOCK signal 1054 is the output of the flip flop 1042. It represents the condition where the first clock 504 and the second clock 514 are in phase. When the two clocks are in phase, the PHASE LOCK signal is high. If out of phase, the PHASE LOCK signal is low.

The PHASE LOCK signal 1054 is inverted by inverter 1056 to form the PHASE LOCK/ signal 1002 which, as discussed previously, forms the input to AND gate 1004 in FIG. 10A.

When the automatic phase lock mode is disabled, the PHASE LOCK signal represents that a phase relationship between the first and second clocks has been established; but this signal is not updated if the phase relationship is subsequently lost. When the automatic phase lock mode is enabled, the mode bit 1046 is high, allowing a phase error to make output 1062 go low. A low value on output 1062 passes through OR gate 1048, forcing the phase lock flip-flop 1042 to go low on the next clock cycle. The PHASE LOCK signal thus simply indicates that a phase locked condition between the first and second clocks was lost; it is updated to represent the phase relationship between these two clocks on an ongoing basis.

The PHASE ERROR signal 1060 indicates whether the phase relationship between the first and second clocks has deteriorated such that the two are no longer in phase. This signal is formed from the output of AND gate 1058. AND gate 1058 simply compares PHASE, the locked in phase of the first clock output by flip flop 1008, with the signal 1038, representing the phase of the first clock as discerned from the outputs of the flip flops 1022, 1024. If the three are all high, indicating a phase error, the PHASE ERROR signal is asserted high. If one of the three are low, indicating lack of a phase error, the PHASE ERROR signal remains low.

The PHASE ERROR signal may be monitored to detect whether the first and second clocks have ever lost their phase relationship. If the signal is asserted, indicating that the two are no longer in phase, the mode bit 1046 can be asserted (high) to enable the automatic mode, and free the PHASE LOCK signal to represent the phase relationship between the first and second clocks on an ongoing basis so that a new phase can be obtained.

Figure 29:
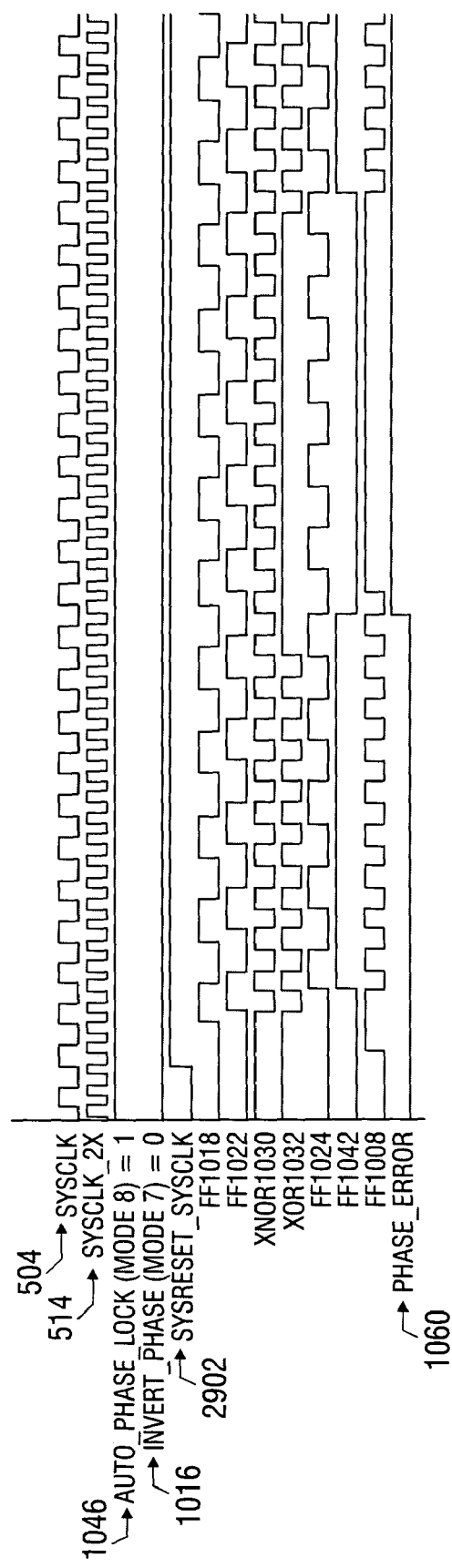
FIG. 29 is a timing diagram for one implementation of the phase detect and enabling logic of FIGS. 10A–10B.

FIG. 29 is a timing diagram illustrating the operation of one implementation of the circuitry of FIGS. 10A–10B. In FIG. 29, each waveform is identified with the corresponding identifying numeral of the signal or logic element output in FIGS. 10A–10B the waveform represents. These signals and logic element outputs have already been explained, and need not be described further. The only waveform in FIG. 29 which is not identified in FIGS. 10A–10B is SYSRESET_SYSCLK, identified with numeral 2902, which represents a reset signal that is asserted low and that is applied to each of the flip-flops illustrated in FIGS. 10A–10B.

FIGS. 12A and 12B illustrate an implementation of the fifth logic 526 in FIG. 5. In this particular implementation, two differential mode clocks may be generated for communication to the receiver. FIG. 12A illustrates one implementation of the circuitry 1200 for generating the first differential mode clock, K and K/. FIG. 12B illustrates one implementation of the circuitry 1202 for generating the second differential mode clock, C and C/. In the case in which the receiver is an SRAM, the first differential mode clock may serve as the write clock, and the second differential mode signal may serve as the read clock.

The PHASE signal 518 is selectively inverted or not based on mode bit 1204. If the mode bit is high, the output 1228 of gate 1206 is the PHASE signal 518, and the output 1230 of gate 1208 is the inverse of the PHASE signal 518. Conversely, if the mode bit is low, the output 1228 of gate 1206 is the inverse of the PHASE signal 518, and the output 1230 is the PHASE signal 518.

The signal 1228 forms the input to D-type flip flops 1210 and 1212. The signal 1230 forms the input to D-type flip flops 1214 and 1216. The flip flops 1210 and 1214 are clocked by the second clock 514. In this particular example, the second clock 514 is assumed to have a frequency which is twice that of the first clock. The flip flops 1212 and 1216 are clocked by the inverse of the second clock 514. Thus, when the mode bit 1204 is high, the output 1232 of flip flop 1210 represents the phase of the first clock in the second clock domain, the output 1234 of flip flop 1212 represents the phase of the first clock in the inverse of the second clock domain, the output 1236 of flip flop 1214 represents the inverse of the phase of the first clock in the second clock domain, and the output 1238 of flip flop 1216 represents the inverse of the phase of the first clock in the inverse of the second clock domain.

The flip flop outputs 1232 and 1234 form the inputs to multiplexor 1218, while the flip flop outputs 1236 and 1238 form the inputs to multiplexor 1220. The selection input to each of the multiplexors 1218 and 1220 is the mode bit 1222.

When the mode bits 1204 and 1222 are high, the output 1224 of multiplexor 1218, which forms the K portion of the clock, is the flip flop output 1234, representing the phase of the first clock in the inverse of the second clock domain, and the output 1226 of multiplexor 1220, which forms the K/ portion of the clock, is the flip flop output 1238, representing the inverse of the first clock phase in the inverse of the second clock domain.

When the mode bit 1204 is high and the mode bit 1222 is low, the output 1224 of multiplexor 1218 is the flip flop output 1232, representing the phase of the first clock in the second clock domain, and the output 1226 of multiplexor 1220 is the flip flop output 1236, representing the inverse of the phase of the first clock in the second clock domain.

Depending on the setting of the mode bits 1204 and 1222, the K portion of the clock may represent the phase of the first clock in the second clock domain, the inverse of the phase of the first clock in the second clock domain, the phase of the first clock in the inverse of the second clock domain or the inverse of the phase of the first clock in the inverse of the second clock domain. The same options apply to the K/ portion of the signal subject to the condition that the K and K/ portions of the clock have opposing polarities.

In FIG. 12B, the mode bit 1252 is an enable/disable bit which can enable or disable the generation of the C, C/ differential mode clock. When low, the C, C/ clock is disabled. The AND gates 1240 and 1242 force the inputs to each of the flip flops 1244, 1246, 1248 and 1250 low. Thus, the outputs of the multiplexors 1254 and 1256, which form the two outputs C and C/, will both be low. When the mode bit 1252 is high, the AND gates 1240 and 1242 allow passage of the outputs of the gates 1258 and 1260 to the inputs of the flip flops. Thus, the outputs C and C/ are enabled.

The mode bit 1262 controls the polarity of the PHASE signal 518 as input to the flip flops 1244, 1246, 1248 and 1250. When the mode bit 1262 is high, gate 1258 feeds the PHASE signal 518 to the inputs of flip flops 1244 and 1246, and gate 1260 feeds the inverse of the PHASE signal 518 to the inputs of flip flops 1248 and 1250. Flip flops 1244 and 1248 are clocked by the second clock 514, while flip flops 1246 and 1250 are clocked by the inverse of the second clock 514.

The mode bit 1222 from FIG. 12A also forms the selection input to each of the multiplexors 1254 and 1256. When the mode bit 1222 is high, assuming that the mode bits 1252 and 1262 are also high, the output of multiplexor 1254, which forms the C portion of the clock, is the output of flip flop 1246, representing the phase of the first clock in the inverse of the second clock domain, and the output of multiplexor 1256, which forms the C/ portion of the clock, is the output of flip flop 1250, representing the inverse of the phase of the first clock in the inverse of the second clock domain. When the mode bit 1222 is low, assuming that the mode bits 1252 and 1262 are high, the output of multiplexor 1254 is the output of flip flop 1244, representing the phase of the first clock in the second clock domain, and the output of multiplexor 1256 is the output of flip flop 1248, the inverse of the phase of the first clock in the second clock domain.

Depending on the setting of the mode bits 1262 and 1222, and assuming the clock is enabled (by setting mode bit 1252 high), the C portion of the clock may represent the phase of the first clock in the second clock domain, the inverse of the phase of the first clock in the second clock domain, the phase of the first clock in the inverse of the second clock domain or the inverse of the phase of the first clock in the inverse of the second clock domain. The same options apply to the C/ portion of the signal subject to the condition that the C and C/ portions of the clock have opposing polarities assuming the clock is enabled.

Figure 13A:
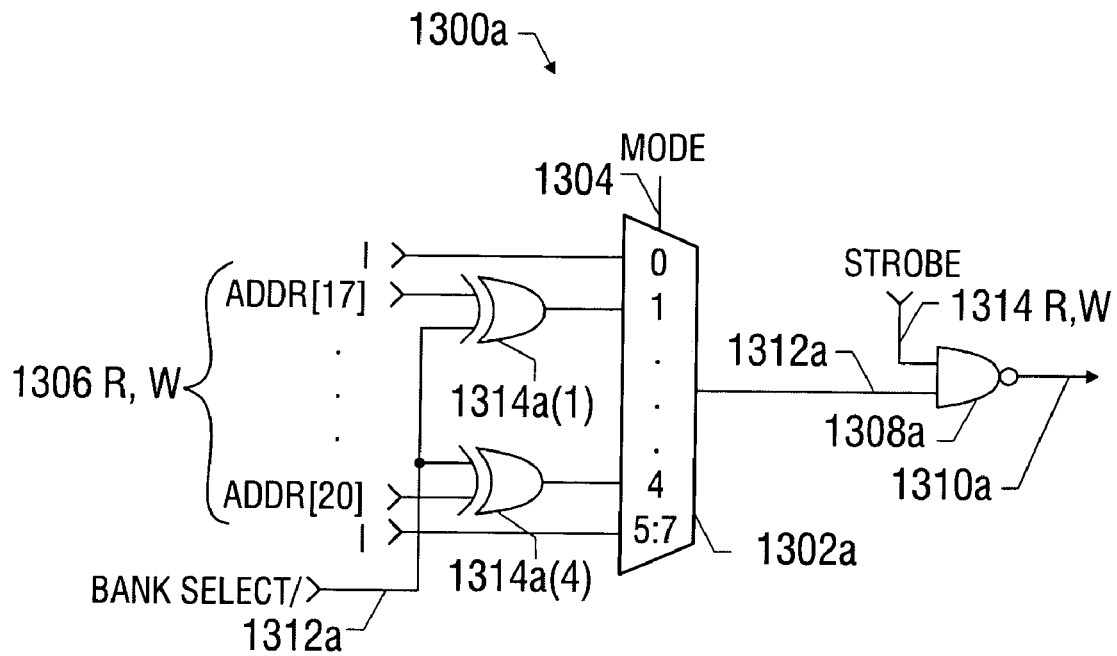
FIGS. 13A and 13B illustrate one implementation of circuitry for implementing a banking feature in the system of FIG. 5.
Figure 13B:
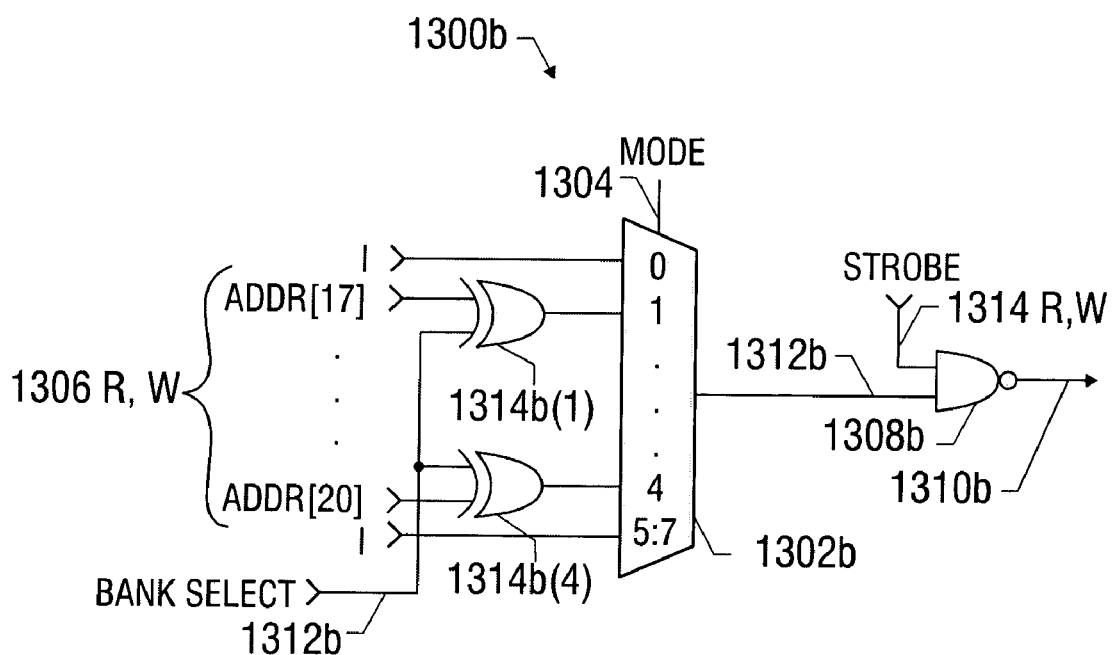

FIGS. 13A and 13B illustrate an implementation of the sixth logic 532 of FIG. 5. The purpose of this particular implementation is to provide a read/write strobe for a banking feature. In this banking feature, it is contemplated that the receiver is an SRAM which is part of a configuration of SRAMS. Each of the SRAMs in the configuration is assumed to be interfaced to a host through the system of FIG. 5. The SRAM configuration extends the depth of any particular SRAM. The banking feature allows the host to issue a read or write strobe to execute a memory operation and to have the physical layout of the memory configuration be transparent to the host.

In one example, each SRAM provides 64K addressable storage locations. The banking feature allows this to be extended to 128K, 256K, 512K, and 1M by adding one, two, three and four additional SRAMs to the configuration. Three mode bits 1304 indicate the depth of the configuration in this example. If the mode bits are set to 0, 5, 6 or 7 in this configuration, it is assumed there is no banking. A value of 1 designates a 128K configuration comprising two 64K banks; a value of 2, a 256K configuration comprising two 128K banks; a value of 3, a 512K configuration comprising two 256K banks; and a value of 4, a 1M configuration comprising two 512K banks.

Two copies of the circuitry are provided, one for the read side, and one for the write side. The two copies of this circuitry are identical so only one copy is shown in FIGS. 13A and 13B. FIG. 13A is the circuitry for one of the two banks, while FIG. 13B is the circuitry for the other of the two banks.

In FIG. 13A, a multiplexor 1302a selects between eight possible inputs, identified as 0, 1, 2, . . . , 7, based on the mode bits 1304. As indicated, the inputs 0, 5, 6 and 7 are tied to a logical "1". Therefore, a mode value of 0, 5, 6 or 7 will result in the formation of a logical "1" at the output 1312a of the multiplexor. The inputs labeled 1, 2, 3 and 4 are tied, respectively, to the outputs of XOR gates 1314a(1), . . . 1314a(4). The inputs to these XOR gates are the $17^{th}$, $18^{th}$, $19^{th}$ and $20^{th}$ address bits, identified in the figure as ADDR[17], ADDR[18], ADDR[19], and ADDR[20], respectively, and a BANK SELECT/ bit 1312a. For the read side, the address bits are read address bits 1306R. For the write side, the address bits are write address bits 1306W.

When BANK SELECT/ bit 1312a is asserted (low), the outputs of the XOR gates 1314a(1) . . . , 1314a(4) are simply the address bits ADDR[17], ADDR[18], ADDR[19], and ADDR[20]. Thus, a mode value of 1 will pass ADDR[17] though to the output 1312a; a mode value of 2 will pass ADDR[18] through to the output 1312a; a mode value of 3 will pass ADDR[19] through to the output 1312a; and a mode value of 4 will pass ADDR[20] through to the output 1312a.

The output 1312a forms one input to NAND gate 1308a. The other input is a STROBE signal 1314 issued by the host. For the read side, the strobe signal is the read strobe signal 1314R; for the write side, the strobe signal is the write strobe signal 1314W. The output 1310a of the NAND gate 1308a forms a STROBE/ signal for the particular bank. If the SRAM is the sole SRAM in a 64K configuration, the STROBE/ signal 1310a will be asserted (low) whenever STROBE is asserted (high). If the SRAM is one of the SRAMs in a larger configuration, the STROBE/ signal will only be asserted if the particular SRAM is within the bank called for by the address bits, ADDR[17], . . . , ADDR[20], and BANK SELECT/ is asserted (low).

In FIG. 13B, a multiplexor 1302b selects between eight possible inputs, identified as 0, 1, 2 . . . , 7, based on the mode bits 1304. As indicated, the inputs 0, 5, 6 and 7 are tied to a logical "1". Therefore, a mode value of 0, 5, 6 or 7 will result in the formation of a logical "1" at the output 1312b of the multiplexor. The inputs labeled 1, 2, 3 and 4 are tied, respectively, to the outputs of XOR gates 1314b(1), . . . 1314b(4). The inputs to these XOR gates are the $17^{th}$, $18^{th}$, $19^{th}$ and $20^{th}$ address bits, identified in the figure as ADDR[17], ADDR[18], ADDR[19], and ADDR[20], respectively, and a BANK SELECT bit 1312b. For the read side, the address bits are read address bits 1306R. For the write side, the address bits are write address bits 1306W.

When BANK SELECT bit 1312b is asserted (low), the outputs of the XOR gates 1314b(1) . . . , 1314b(4) are simply the address bits ADDR[17], ADDR[18], ADDR[19], and ADDR[20]. Thus, a mode value of 1 will pass ADDR[17] though to the output 1312b; a mode value of 2 will pass ADDR[18] through to the output 1312b; a mode value of 3 will pass ADDR[19] through to the output 1312b; and a mode value of 4 will pass ADDR[20] through to the output 1312b.

The output 1312b forms one input to NAND gate 1308b. The other input is a STROBE signal 1314 issued by the host. For the read side, the strobe signal is the read strobe signal 1314R; for the write side, the strobe signal is the write strobe signal 1314W. The output 1310b of the NAND gate 1308b forms a STROBE/ signal for the particular bank. If the SRAM is the sole SRAM in a 64K configuration, the STROBE/ signal 1310b will be asserted (low) whenever STROBE is asserted (high). If the SRAM is one of the SRAMs in a larger configuration, the STROBE/ signal will only be asserted if the particular SRAM is within the bank called for by the address bits, ADDR[17], . . . , ADDR[20], and BANK SELECT is asserted (low).

Figure 14:
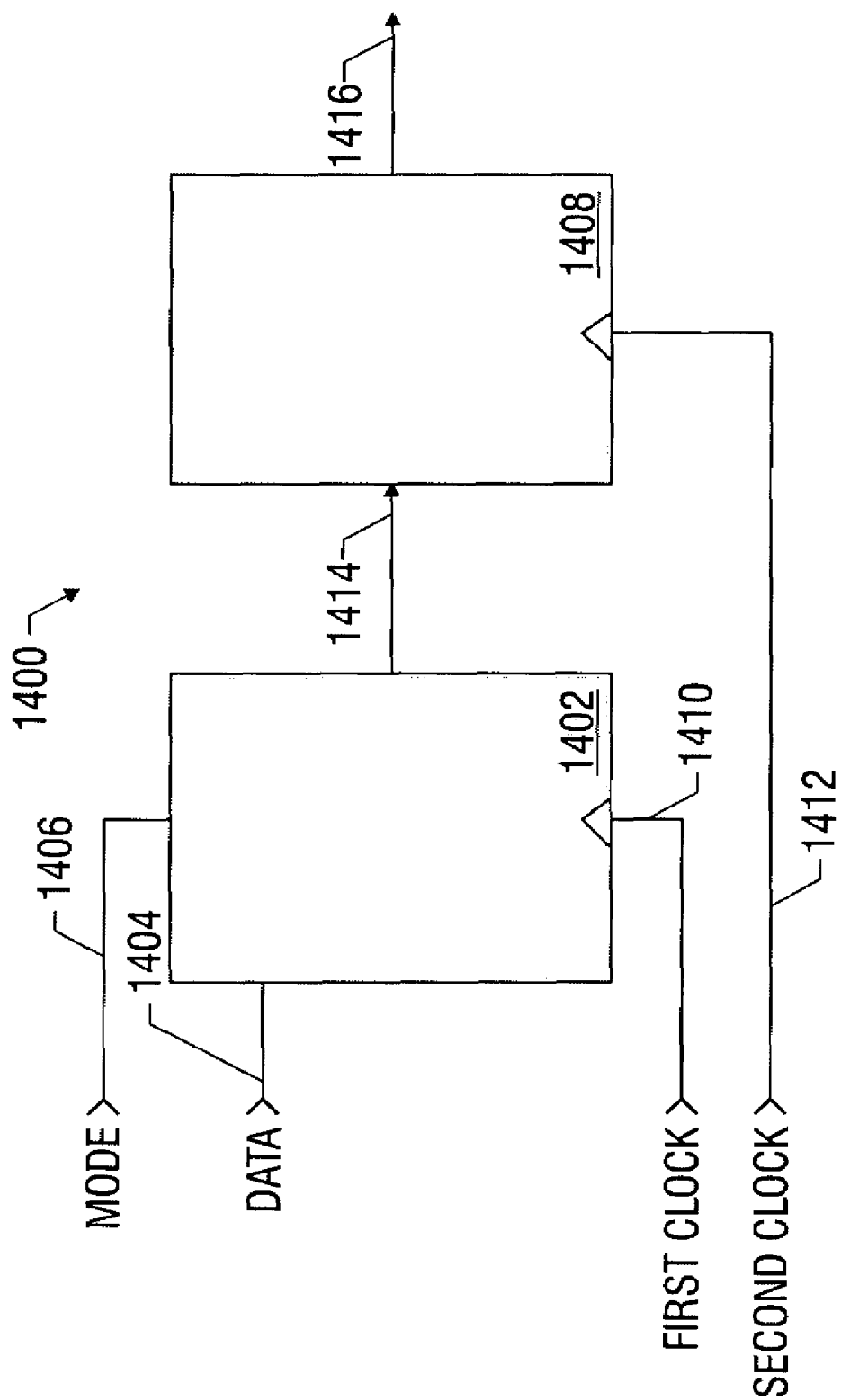
FIG. 14 is a block diagram of a system for clocking first and second portions of data from a sender using first and second clock edges, respectively, where the polarity of the first and second edges is determined responsive to a selected mode.

FIG. 14 illustrates a second embodiment 1400 of a system for processing data for communication between a sender and receiver. In this system, first logic 1402 clocks in first and second portions of data from the sender over one or more signal lines 1404. The data is clocked in using first and second edges, respectively, of a first clock 1410. The polarity of the first and second edges is determined responsive to a pre-determined mode 1406 selected from a plurality of possible modes. In one implementation, the first and second edges have a first polarity if a first pre-determined mode is in effect, and have a second polarity if a second pre-determined mode is in effect.

Data derived from the clocked in data is input to second logic 1408 over one or more signal lines 1414. The second logic 1408 synchronizes, for communication to the receiver, this input data using a second clock 1412. The synchronized data is output from the second logic 1408 over one or more signal lines 1416.

Figure 15:
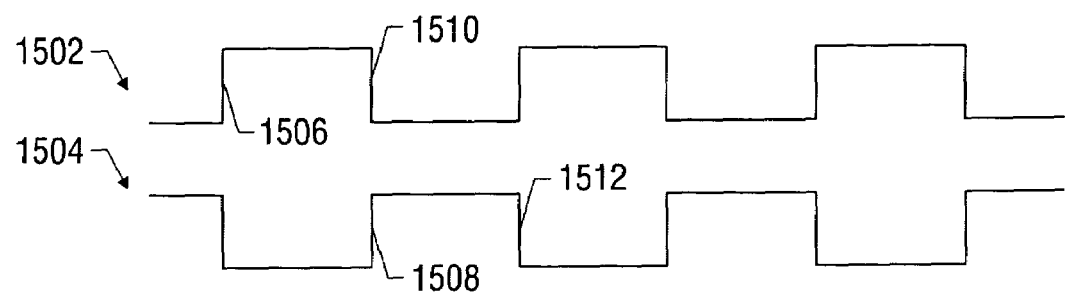
FIG. 15 illustrates possible variations in the first and second edges in one example of the system of FIG. 14.

In one implementation, the first clock 1410 is a differential mode signal, and the first and second edges are edges of like polarity from opposing polarity portions of the differential mode signal. FIG. 15 illustrates one example of the first clock in this implementation. Numerals 1502 and 1504 identify, respectively, first and second opposing polarity portions of the differential mode signal. In one example, assuming a first pre-determined mode is in effect, the first and second edges on which the first and second portions of the data is clocked in by the first logic are identified, respectively, with numerals 1506 and 1508. In another example, assuming a second predetermined mode is in effect, these first and second edges are identified with numerals 1510 and 1512, respectively.

In one example, the first and second portions of clocks are clocked in sequentially by the first logic 1402 over the same one or more signal lines.

In one embodiment, the system 1400 further comprises third logic (not shown) for transforming data clocked in by the first logic 1402. This third logic transforms the data responsive to a pre-determined mode selected from a plurality of possible modes, and provides the transformed data to the second logic 1408.

In one example of this embodiment, the third logic is configured to swap the first and second portions of the data responsive to the pre-determined mode. In a second example, the third logic is configured to vary the latency of one or both of the first and second portions of the data responsive to the pre-determined mode. In a third example, the third logic is configured to independently vary the latency of the first and second portions of the data responsive to the pre-determined mode.

The system 1400 in FIG. 14 may further comprise driver and trace circuitry (not shown) for communicating source synchronous data, after processing by the system 1400, to the receiver. This circuitry, if present, may be located to the left at that depicted in FIG. 14, to the right, or both.

Figure 16:
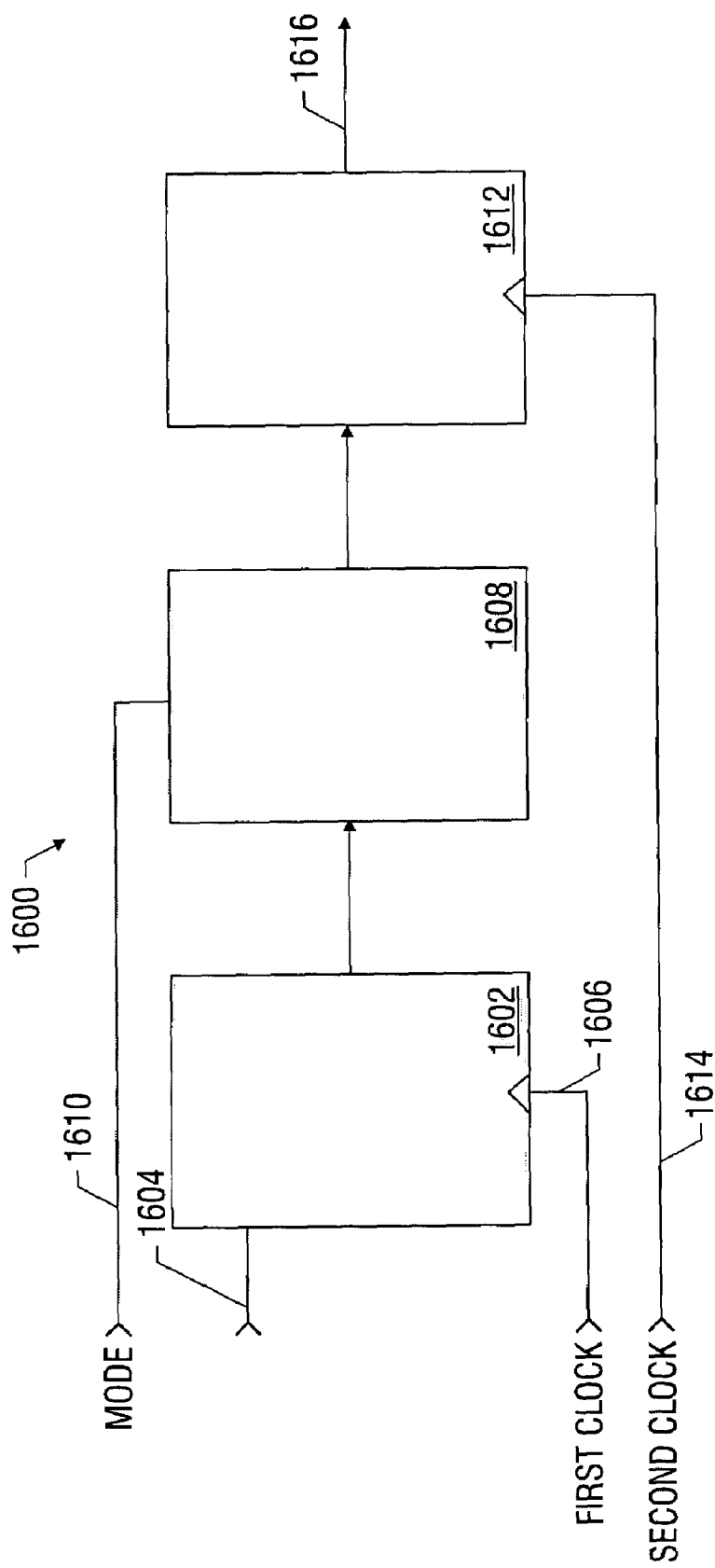
FIG. 16 is a block diagram of a system for clocking in data from a sender using a first clock, transforming the clocked in data responsive to a selected mode, and synchronizing the transformed data to a second clock.

FIG. 16 illustrates a third embodiment 1600 of a system for processing data for communication between a sender and receiver. In this embodiment, first logic 1602 clocks in data from the sender over one or more signal lines 1604 using a first clock 1606. Second logic 1608 transforms at least a portion of the clocked in data responsive to a pre-determined mode 1610 selected from a plurality of possible modes. Third logic 1612 synchronizes, for communication to the receiver, at least a portion of the transformed data using a second clock 1614. The third logic 1612 outputs the synchronized data over one or more signal lines 1616.

The system 1600 may also comprise driver and trace circuitry located to the right of, the left of, or both to the left of and right of the circuitry depicted in FIG. 16.

Figure 17:
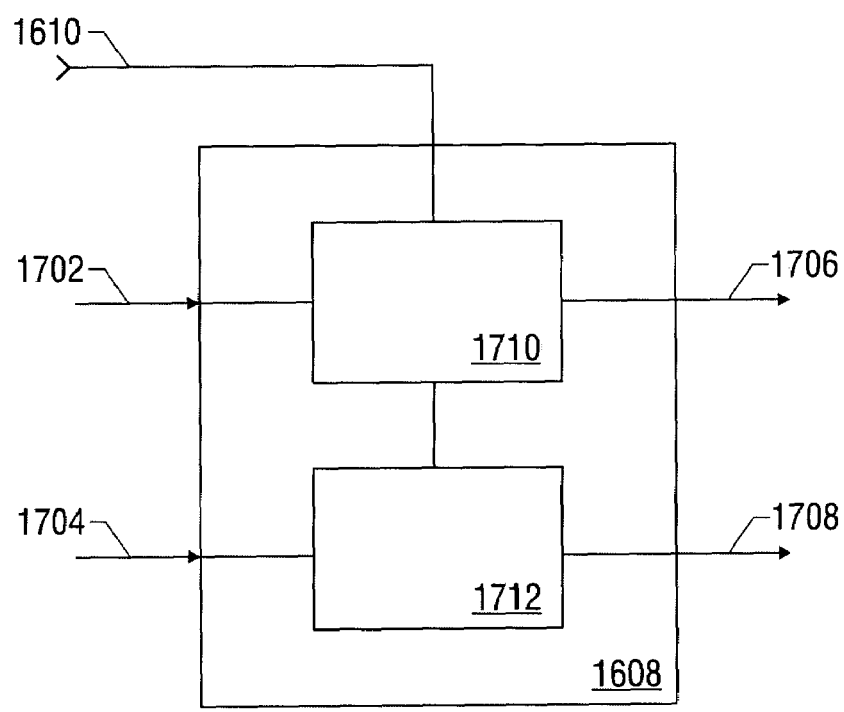
FIG. 17 is a block diagram of one implementation of the transforming circuitry of FIG. 16.

In one implementation, illustrated in FIG. 17, the data clocked in by the first logic 1602 comprises first and second portions which are provided to the second logic in parallel over, respectively, signal lines 1702 and signal lines 1704. In one example, the second logic is configured to swap the first and second portions responsive to the pre-determined mode 1610. Thus, in FIG. 17, assuming a swap is desired, the first data input on signal lines 1702 is output on signal lines 1708, and the second data input on signal lines 1704 is output on signal lines 1706. The data on signal lines 1706 and 1708 is then synchronized and output in parallel by the third logic 1612.

In another implementation, also illustrated in FIG. 17, the first data input on signal lines 1702 is passed through a variable delay element 1710 and then output on signal lines 1706. Similarly, the second data input on signal lines 1704 is also passed through a variable delay element 1712 and then output on signal lines 1708. The latency introduced by the delay elements 1710 and 1712 is a variable which is determined responsive to the pre-determined mode 1610.

In one example, the latency introduced by the delay elements 1710 and 1712 may be independently varied responsive to the predetermined mode. In this example, the first portion of the data may be subjected to a longer latency than the second portion of the data, and vice versa.

Figure 18:
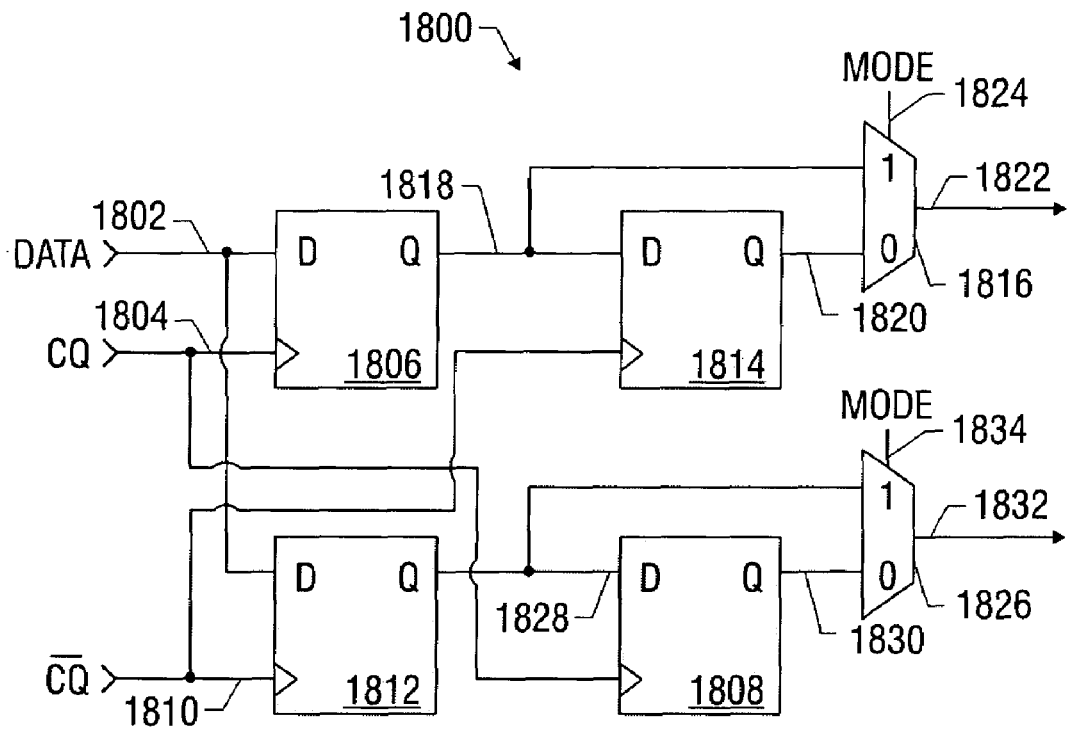
FIG. 18 is one implementation of circuitry for varying the polarity of the first and second clock edges used to clock in data from the sender in the system of FIGS. 14 and 16.
Figure 19:
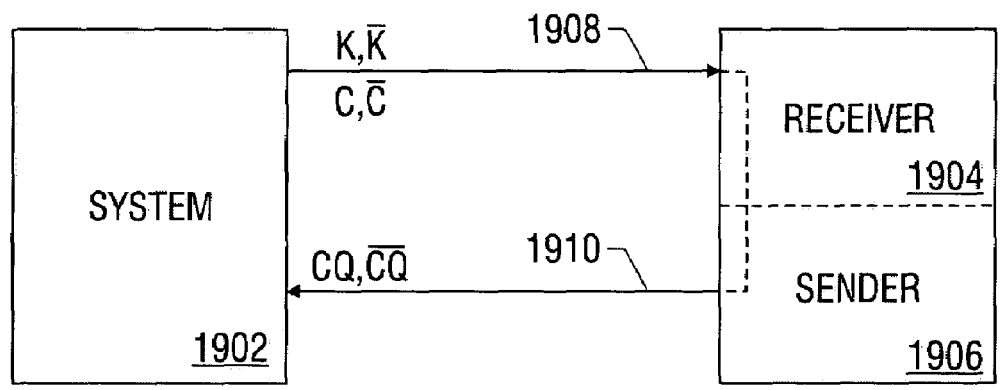
FIG. 19 is an example showing the generation of an echo clock at the receiver.

FIG. 18 illustrates one implementation 1800 of first logic 1402 in FIG. 14 or first logic 1602 in FIG. 16. As illustrated in FIG. 18, this implementation is clocked by a differential mode clock having a first portion CQ, identified with numeral 1804, and a second opposing polarity portion CQ/, identified with numeral 1810. In one example, the CQ, CQ/ differential mode clock is an echo clock derived from one or the other of the K, K/ or C, C/ differential mode clocks discussed previously. FIG. 19 illustrates an embodiment in which the CQ, CQ/ differential mode clock is an echo of one or the other of the K, K/ or C, C/ clocks. A system 1902 in accordance with the invention is configured to provide either or both the K, K/ and C, C/ clocks to receiver 1904 over the one or more signal lines 1908. The receiver 1904 passes one or both of these clocks to sender 1906. Sender 1906, after a delay reflecting the round trip time through the receiver 1904 and sender 1906, echos one or the other of these clocks back to the system 1902 over one or more signal lines 1910. The CQ, CQ/ differential mode clock is the clock communicated back to the system 1902 in this example over the one or more signal lines 1910.

Returning to FIG. 18, two modes of operation are supported. In the first mode, a first portion of data is received from the sender over one or more signal lines 1802 on a rising edge of CQ, and a second portion of data from the sender is then received over these same signal lines on the next rising edge of CQ/. In the second mode, the first portion of the data is received over these signal lines on a rising edge of CQ/, and the second portion of the data is received over these same signal lines on the next rising edge of CQ.

The state of mode bits 1824 and 1834 reflect which of the two modes is in effect. These mode bits are the selection inputs to multiplexors 1816 and 1826, respectively. If the first mode is in effect, the mode bit 1824 is set to select, at the output 1822 of multiplexor 1816, the output 1820 of flip flop 1814, and mode bit 1834 is set to select, at the output 1832 of multiplexor 1826, the output 1828 of flip flop 1812. If the second mode is in effect, the mode bit 1824 is set to select, at the output 1822 of multiplexor 1816, the output 1818 of flip flop 1806, and mode bit 1834 is set to select, at the output 1832 of multiplexor 1826, the output 1830 of flip flop 1808.

If the first mode is in effect, the first portion of data is clocked into flip flop 1806 upon a rising edge of CQ, and then clocked into flip flop 1814 upon the next rising edge of CQ/. In addition, upon this next rising edge of CQ/, the second portion of data is clocked into flip flop 1812. The selection inputs to the multiplexors 1816, 1826 are such that the first portion of the data appears at the output 1822 of multiplexor 1816, and the second portion of the data appears at the output 1832 of multiplexor 1826.

If the second mode is in effect, the first portion of data is clocked into flip flop 1812 upon a rising edge of CQ/, and then clocked into flip flop 1808 upon the next rising edge of CQ. In addition, upon this next rising edge of CQ, the second portion of data is clocked into flip flop 1806. The selection inputs to the multiplexors 1816, 1826 are such that the first portion of the data appears at the output 1832 of multiplexor 1832, and the second portion of the data appears at the output 1822 of multiplexor 1816.

Figure 20:
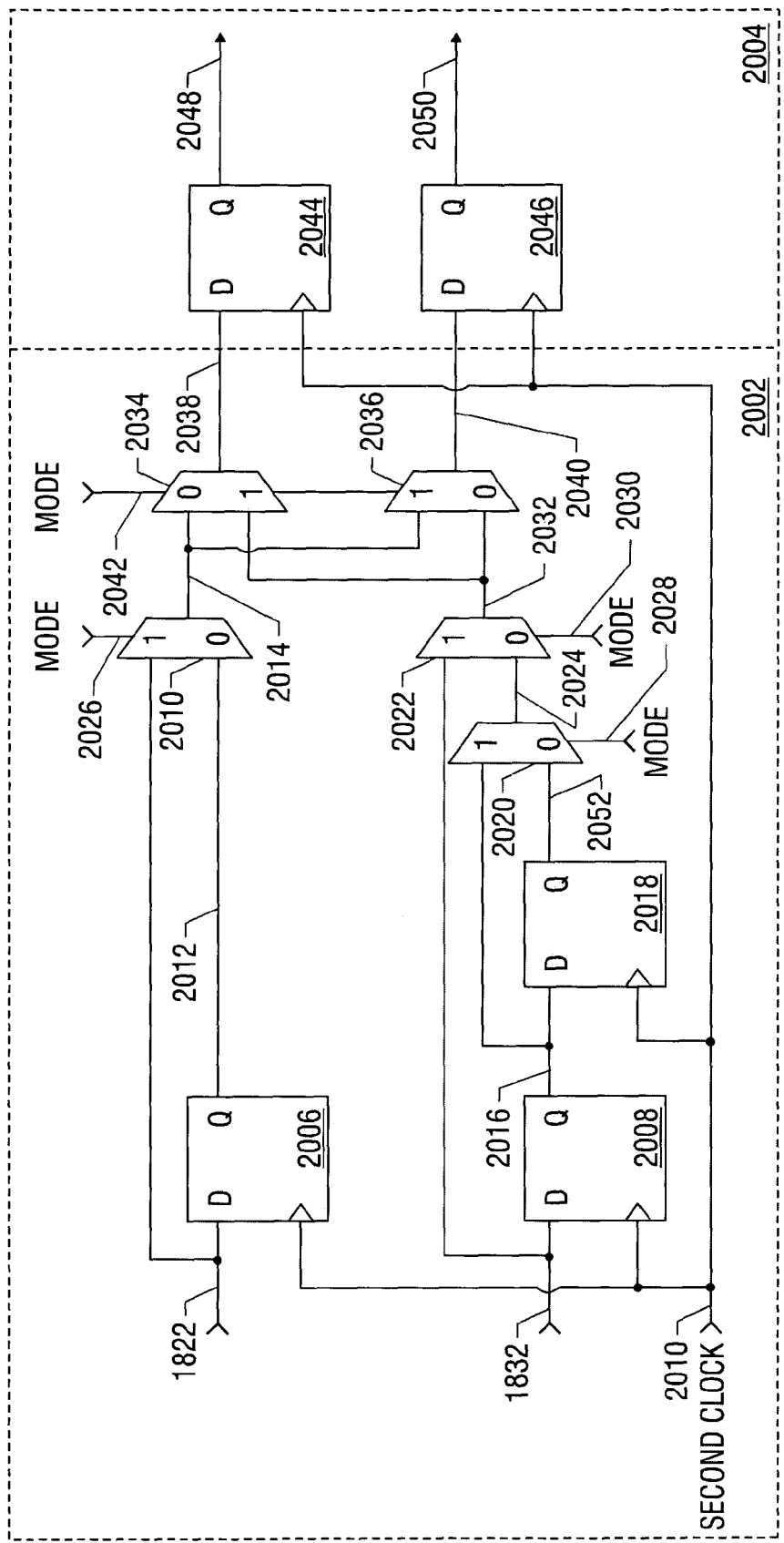
FIG. 20 is one implementation of the transforming circuitry in the system of FIG. 16.

FIG. 20 illustrates an implementation of second logic 1608 and third logic 1612 in FIG. 16. This particular implementation is particularly suitable for use in conjunction with the implementation 1800 of the first logic 1602 illustrated in FIG. 18. In FIG. 20, the implementation of the second logic 1608 is identified with numeral 2002, and the implementation of the third logic 1612 is identified with numeral 2004.

The output 1822 of multiplexor 1816 in FIG. 18 is coupled to the input of flip flop 2006 in FIG. 20. Similarly, the output 1832 of multiplexor 1826 in FIG. 18 is coupled to the input of flip flop 2008. As discussed, depending on the mode bits 1824 and 1834 in FIG. 18, the output 1822 may represent either the first or second portions of data clocked in from the sender using either the CQ or CQ/ portions, respectively, of the differential mode clock input. Similarly, depending on these mode bits, the output 1832 may represent either the first or second portions of data clocked in from the sender using either the CQ/ or CQ portions, respectively, of the differential mode clock input.

By avoiding the use of FIFO buffers, the circuitry of FIG. 20 achieves a reduced latency compared to FIFO implementations. Depending on the application, it may be desirable to increase the latency of the data streams. The circuitry of FIG. 20 is configured to independently vary the latency of the two data streams 1822 and 1832 dependently on the mode bits 2026, 2028, and 2030. The mode bit 2026 controls the latency applied to the data stream 1822. The mode bits 2028 and 2030 control the latency applied to the data stream 1832. Through mode bit 2026, the latency applied to the stream 1822 can be varied between first and second integer multiples of clock cycles of the second clock 2010. Through mode bits 2028 and 2030, the latency applied to stream 1832 can be varied between first, second and third integer multiples of clock cycles of the second clock 2010. Note that some of this latency may be applied by the circuitry illustrated in FIG. 20; the rest may be applied by other circuitry in the system.

The circuitry 2002 also allows the two data streams 1822 and 1832 to be swapped before passage to the implementation 2004 of the third logic 1612. This degree of control is provided by the mode bit 2042.

The data from stream 1822 is clocked through flip flop 2006. Multiplexor 2010 selects between the output of the flip flop 2006 and the stream 1822 based on the mode bit 2026. If the mode bit is in a first state, indicating that a first clock cycle delay is to be implemented, the output 2012 of flip flop 2006 is provided on signal line 2014. If the mode bit is in a second state, indicating that a second clock cycle delay is to be implemented, the stream 1822 is provided directly on signal line 2014.

The data from stream 1832 is clocked through flip flops 2008 and 2018. Multiplexor 2020 selects between the output 2052 of flip flop 2018 and the output 2016 of flip flop 2008 based on the mode bit 2028 and multiplexor 2022 selects between the output 2024 of multiplexor 2020 and the stream 1832 based on the mode bit 2030. If the mode bits 2028 and 2030 are both in a first state, the stream 1832 is subjected to a first clock cycle delay. If the mode bit 2028 is in a second state, and the mode bit 2030 in a first state, the stream 1832 is subjected to a second clock cycle delay. If the mode bit 2030 is in a second state, the stream 1832 is subjected to a third clock cycle delay.

Multiplexor 2034 selects between the output 2014 of multiplexor 2010 and the output 2032 of multiplexor 2022 based on the mode bit 2042. Similarly, multiplexor 2036 selects between the output 2032 of multiplexor 2022 and the output 2014 of multiplexor 2010 based on the mode bit 2042. If the mode bit 2042 is in a first state, the output 2032 of multiplexor 2022 is provided on signal line 2040, and the output 2014 of multiplexor 2010 is provided on signal line 2038. If the mode bit 2042 is in a second state, the output 2032 of multiplexor 2022 is provided on signal line 2038, and the output 2014 is provided on signal line 2040.

Flip flops 2044 and 2046 are needed to place the two outputs 2038, 2040 into the second clock domain in case no latency is applied to the two outputs by the circuitry 2002. If latency is applied to these outputs, then the outputs are already in the second clock domain, and flip flops 2044 and 2046 simply add another clock cycle of latency to the outputs.

The output of flip flop 2044 is provided on signal lines 2048 for communication to the receiver. Similarly, the output of flip flop 2046 is provided on signal line 2050 for communication to the receiver.

Figure 21A:
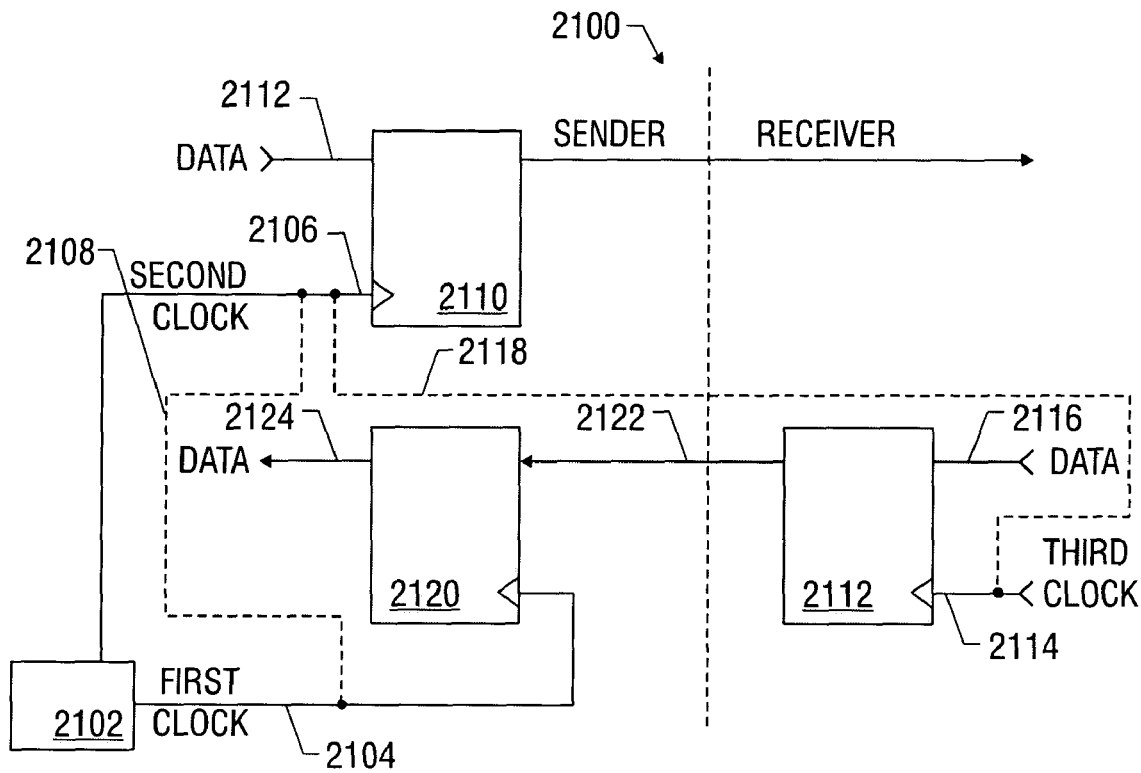
FIG. 21A is a block diagram of a system for providing a first clock delayed relative to a second clock by a predetermined amount, clocking data for communication to the receiver using the second clock, clocking data from the receiver for communication to the sender using a third clock derived from the second clock, and then synchronizing data derived from the clocked in data to the first clock.

FIG. 21A illustrates a fourth system 2100 for processing data for communication between a sender and receiver. In this system, first logic 2102 provides a first clock 2104 delayed relative to a second clock 2106 by a pre-determined amount. In one implementation, the first and second clocks bear a phase relationship, as indicated in phantom in FIG. 21 with identifying numeral 2108.

In this system, second logic 2110 synchronizes, for communication to the receiver, data 2112 from the sender using the second clock 2106. Third logic 2112 clocks in, using a third clock 2114 derived from the second clock 2106, data 2116 from the receiver. The relationship between the second and third clocks is indicated in phantom in FIG. 21A with identifying numeral 2118.

Fourth logic 2120 synchronizes, for communication to the sender, data 2122 derived from the clocked in data using the first clock 2104. The synchronized data is output for the sender on signal lines 2124.

Figure 22:
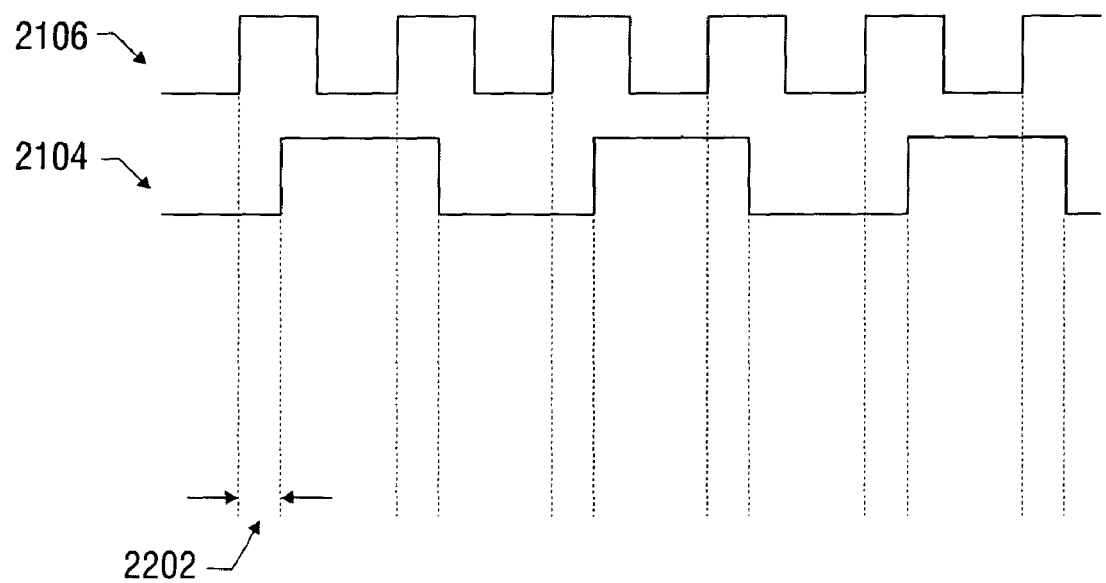
FIG. 22 is an example of waveforms showing a first clock delayed relative to a second clock by a predetermined amount.
Figure 23:
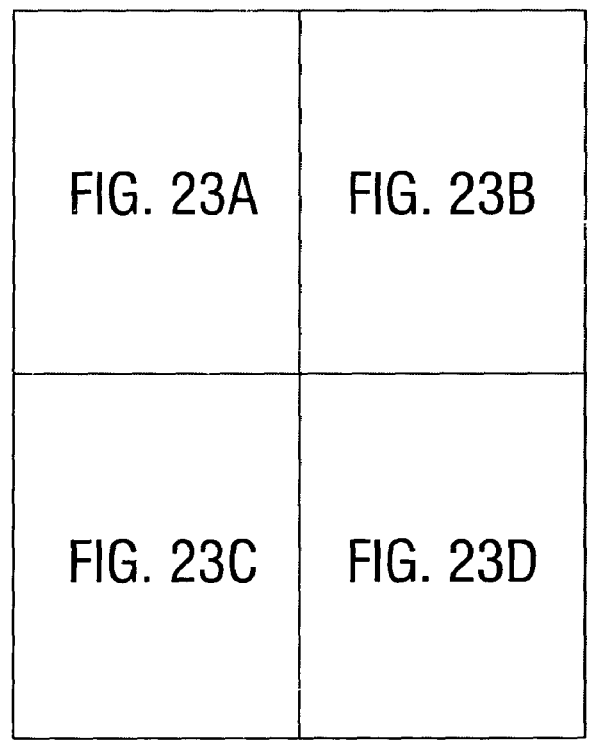
FIGS. 23A, 23B, 23C and 23D together show an example implementation of a bi-directional system for processing data for communication between an ASIC and an SRAM.
Figure 23A:
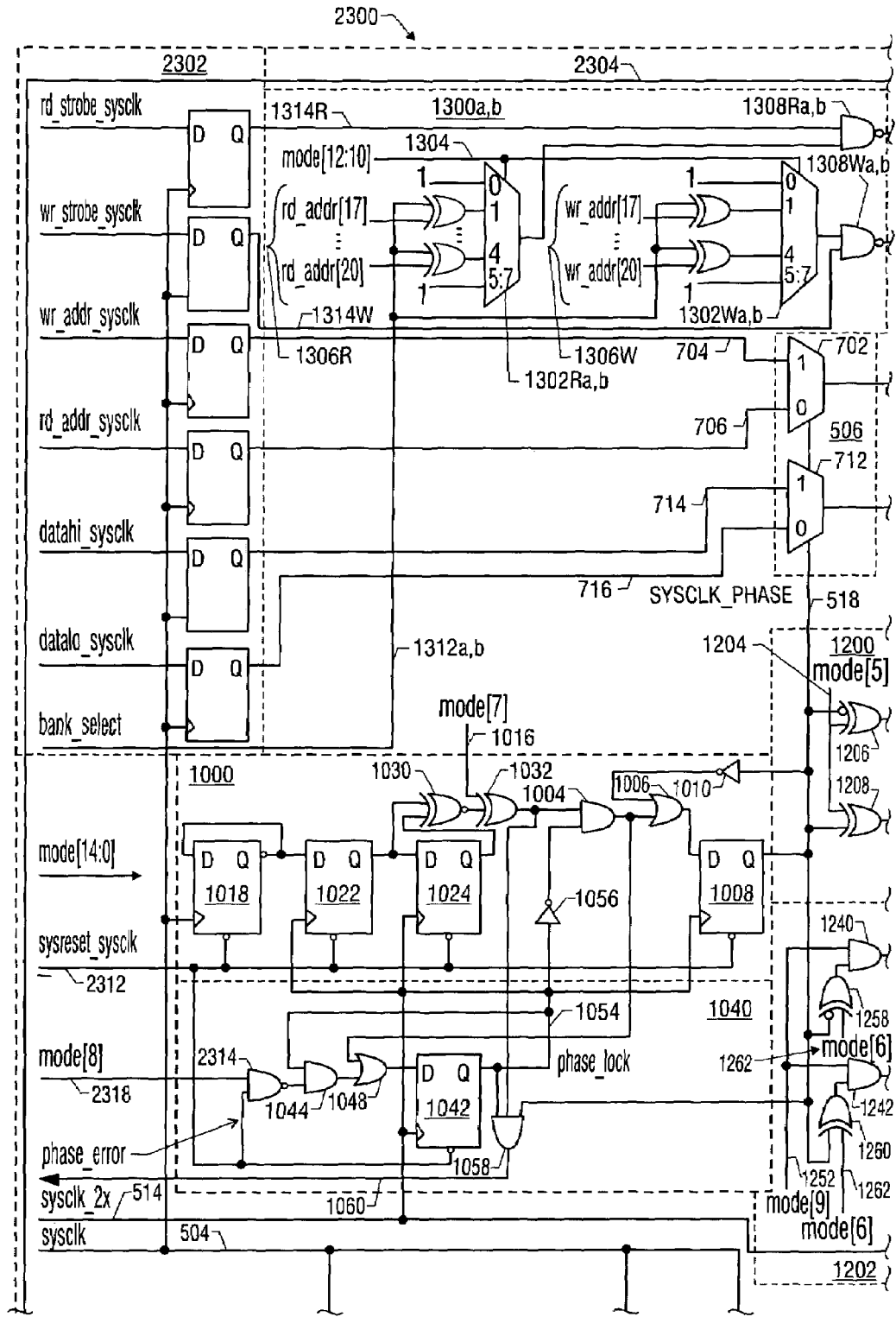
Figure 23B:
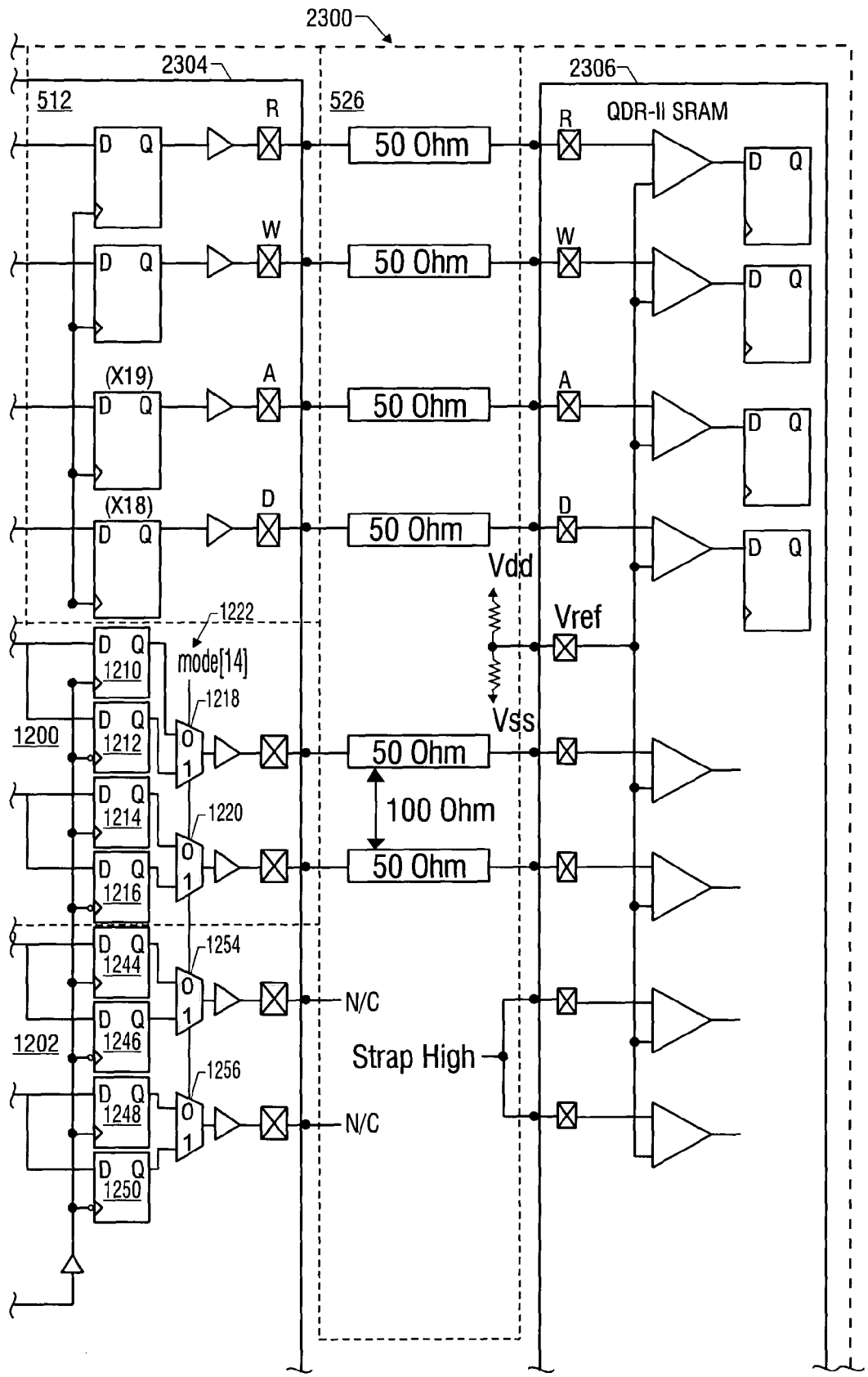
Figure 23C:
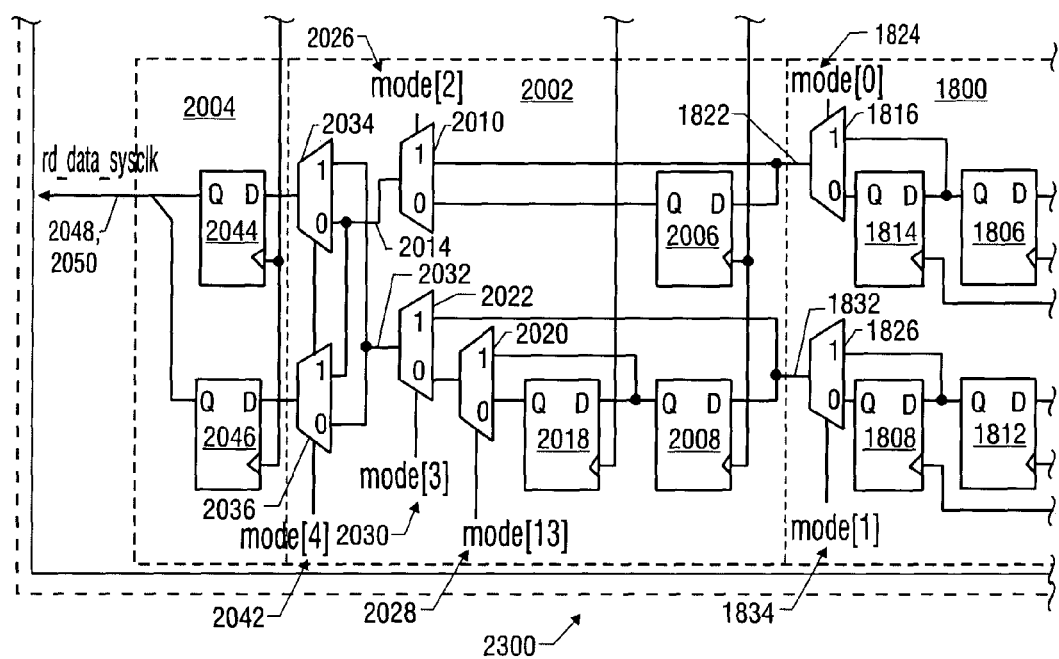
Figure 23D:
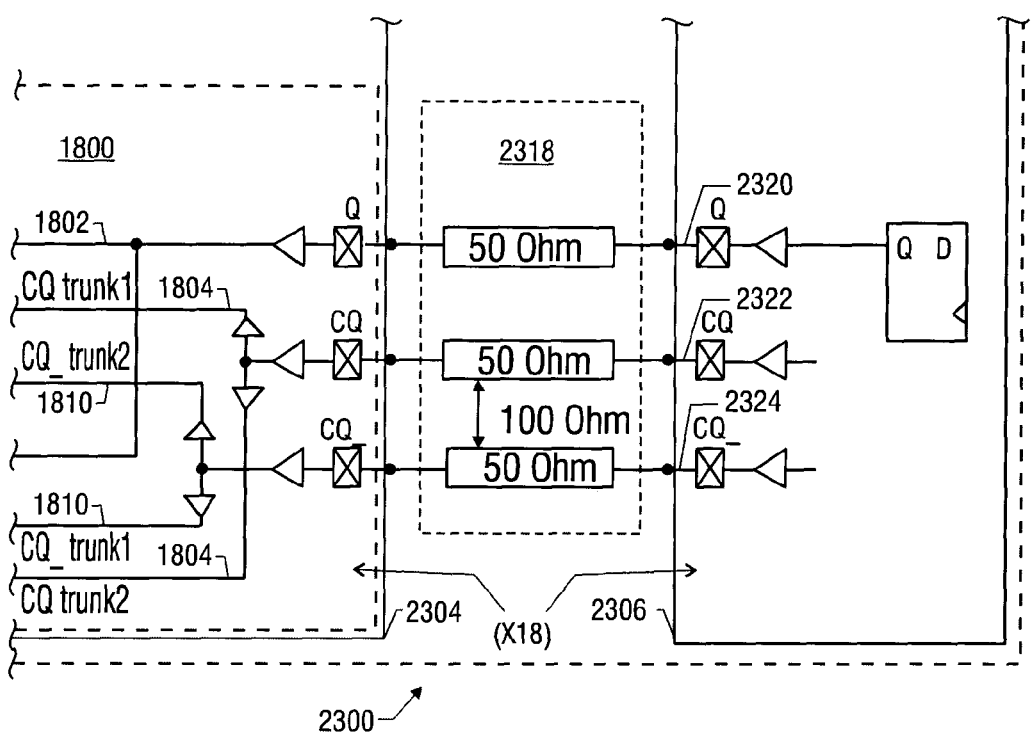

In this system, the pre-determined amount by which the first clock is delayed relative to the second clock reduces latency of the system. To see this, observe that delaying the first clock 2104 by a predetermined amount relative to the second clock 2106 is equivalent to advancing the second clock 2016 relative to the first clock 2104 by this predetermined amount. This can be seen in the example of FIG. 22, which shows first clock 2104 and second clock 2106, where the delay of the first clock 2104 relative to the second clock 2106 is the predetermined amount 2202. As can be seen by comparing the second clock 2106 with the first clock 2104, the effect of all this is to advance the second clock relative to the first by the predetermined amount 2202.

Since data to the receiver is launched by the second clock 2106, that means that the receiver has more time to complete a transaction based on this data. The extra amount of time available to the receiver is the predetermined delay 2022.

The system 2100 may also comprise driver and trace circuitry (not shown) which may be located on the left of, the right of, or both the left of and right of the circuitry depicted in FIG. 21A.

Figure 21B:
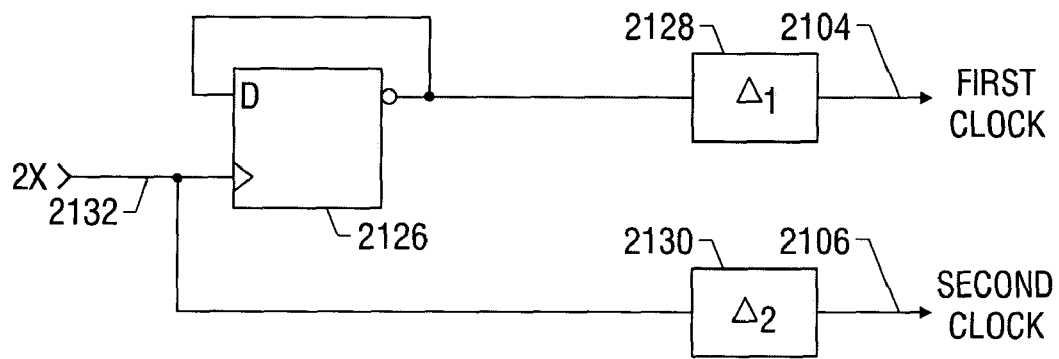
FIG. 21B is a block diagram of a particular implementation of circuitry for providing the first and second clocks in the system of FIG. 21A.

FIG. 21B illustrates a particular implementation of the first logic 2102. In this particular implementation, a signal 2132 having a frequency twice that of the desired frequency of the first clock 2104 is input to the clock input of D-type flip-flop 2126 as shown. The inverted output of the flip-flop 2126 is fed back to its data input as shown. The output of the flip-flop 2126 is input to a first clock tree 2128 as shown. This first clock tree implements a delay $\Delta_1$ as shown. The output of this first clock tree is the first clock 2104. The signal 2132 is input to a second clock tree 2130 as shown. This second clock tree implements a delay $\Delta_2$ as shown. The output of this second clock tree is the second clock 2106. The values $\Delta_1$ and $\Delta_2$ are set such that the sum of the delay through flip-flop 2126 and $\Delta_1$ minus $\Delta_2$ is the predetermined amount by which the first clock 2104 is delayed relative to the second clock 2106.

FIGS. 23A, 23B, 23C, and 23D illustrates an example implementation of a bi-directional system 2100 according to the invention. The example is configured for interfacing between a host ASIC 2304 and an SRAM 2306. It is contemplated in this particular example that the ASIC 2304 and SRAM 2306 would each be implemented as an integrated circuit chip, and that the two chips would be mounted on the same circuit board and coupled together with 50 ohm trace lines no longer than about 1.5 to 2.5 inch for data and no longer than about 9 inches for clocks. It is also contemplated in this particular example that a substantial portion of the system 2300 would be implemented as part of the ASIC 2304.

This particular example has a read side and a write side. The write side comprises the blocks 1300*a*, 1300*b*, 506, 1000, 1040, 1200, 1202, and 512 appearing in FIGS. 23A and 23B. The read side comprises the blocks 1300*a*, 1300*b*, 1800, 2002, and 2004 illustrated in FIGS. 23C and 23D. Each of these blocks is configured to function in like manner to the like-numbered blocks which have already been described in relation to FIGS. 5, 10A, 10B, 12A, 12B, 13, 18 and 20. Thus, for purposes of brevity and clarity, this previous discussion will not be replicated here, and only additional points needed for clarity will be discussed here.

On the read side, the data which may be communicated to the SRAM comprises read strobe 1314R, and read address 706. In this particular implementation, it is assumed that the read address 706 is 19 bits wide, but it should be appreciated that other examples are possible.

Moreover, it is also assumed that this data, prior to communication to the SRAM, is latched by the D-type flip flops comprising circuitry 2302 using the first clock 504. In this particular example, to minimize clock skew, the circuitry 2302 is assumed to be placed near an edge of the ASIC 2304. Also, in this particular example, it is assumed that the first clock 504 has a frequency of 200 MHz, but it should be appreciated that other examples are possible.

Bank select bits 1312a, b are also latched by circuitry 2302. These bits are not communicated to the SRAM, but instead, is used to implement the bank select function, described previously in relation to FIGS. 13A and 13B.

The second clock 514 in this particular example is assumed to have a frequency of 400 MHz, twice that of the first clock 504, although it should be appreciated that other examples are possible. The second clock 514 in this example is assumed to be generated by a phase locked loop (PLL) on the ASIC.

The first clock 504 in this example is delayed relative to the second 514 because it is subject to a larger clock tree insertion delay than the second clock 514. This delay, set to satisfy the setup and hold requirements for the next stage of flip-flops, helps reduce latency in the system for the reasons described previously.

The circuitry 1000 outputs a signal 518 representing the phase of the first clock 504 in the manner previously described, and the circuitry 1040 implements the automatic phase lock feature previously described. Circuitry 1040 also generates the PHASE ERROR/ signal previously described. The RESET/ signal 2312 (not shown in FIGS. 10A, 10B for purposes of clarity) resets each of the flip flops 1008, 1018, 1022, 1024 and 1042 to the low state upon system power up.

The circuitry 1200 generates the K, K/ differential mode clock from the second clock 514 in the manner previously described. This clock controls the timing in which the data is communicated to the SRAM for both write and read operations. The circuitry 1202 is provided to generate the C, C/ differential mode clock, but in this particular example, this clock is not used.

The data for a write operation (write strobe, write address, write data hi, and write data low) is communicated to the SRAM using the timing sequence illustrated in FIG. 7. In this particular implementation, it is assumed that the write address 704 is 19 bits wide, and that the data hi 714 and data low 716 portions are each 18 bits wide, but it should be appreciated that other examples are possible.

The data for a read operation (read strobe, read address) is communicated to the SRAM using the timing sequence illustrated in FIG. 8. This figure also shows the timing sequence in which the read data is received from the SRAM over the read side portion of the system 2300. The CQ, CQ/ clock controls this latter timing. In this particular example, it is assumed to be an echo of the K, K/ clock.

The data is buffered and communicated over 50 ohm trace lines (comprising circuitry 526) to the SRAM 2306. Similarly, the K, K/ clock is buffered and communicated over 50 ohm trace lines (comprising circuitry 526) to the SRAM 2306. The length of the trace lines for the K, K/ clock signals is extended relative to that for the data signals so that the clock transitions are delayed by ¼ clock cycle relative to the data signals. That centers the transitions of the clock signals within the windows of validity of the data signals. Note that, although the related drivers and pads are shown outside circuitry 526, it should be appreciated that embodiments are possible where these drivers and pads are part of circuitry 526.

In the read side portion of system 2300, the data hi and data low portions of the read data are sequentially communicated from the SRAM over signal lines 2320. The data is transmitted over 50 ohm trace lines (comprising circuitry 2318) to circuitry 1800. The data is accompanied by the CQ, CQ/ differential mode clock signals which are also communicated over 50 ohm trace lines comprising circuitry 2318. The trace lines are the CQ, CQ/ clock signals are extended in relation to those for the data signals so that the clock transitions are delayed ¼ of a clock cycle in relation to the associated data. This centers the clock transitions within the windows of validity of the data signals. Note again that, although the related drivers and pads are shown as being outside circuitry 2318, embodiments are possible where these drivers and pads are part of circuitry 2318.

Within circuitry 1800, the CQ portion of the clock is divided into two trunks, both of which are identified with numeral 1804. Similarly, the CQ/ portion of the clock is divided into two trunks, both of which are again identified with numeral 1810.

In circuitry 1800, the data hi portion can be clocked in on the rising edge of CQ or CQ/ and the data low portion clocked in on the rising edge of CQ/ or CQ depending on the mode selected with mode bits 1824 and 1834. In circuitry 2002, the latency applied to these two portions can be independently varied based on mode bits 2026, 2028 and 2030. Moreover, these two portions can be swapped based on mode bit 2042.

This data is placed in the domain of the first clock 504 by circuitry 2004, and then communicated to other portions of the ASIC host over signal lines 2048, 2050.

The system 2100 utilizes fifteen mode bits, mode[0], . . . , mode [14], the function of which should be clear from the context since, except for the mode [8], each of these bits has direct counterparts in the previous discussion. As to the mode [8] bit, that bit is identified in FIG. 23A with numeral 2318. It corresponds to but is the inverse of the mode bit 1046 of FIG. 10B. A summary of the functions performed by these mode bits is provided in FIG. 22. Each of these fifteen mode bits can be independently set.

In various ones of the figures, single bit logic devices were illustrated for purposes of clarity, but it should be appreciated that, depending on the context, these single bit devices may represent multiple instances of a single bit device coupled or integrated together in parallel to handle in parallel all the bits of a multi-bit word. For example, in FIG. 9, the multiplexors 702, 712 will generally be multi-bit devices to handle in parallel the multiple bits comprising read addresses, write addresses, data hi portions of data words, and data low portions of data words. The same condition applies to the (ostensibly) single bit D-type flip flops and multiplexors illustrated in FIGS. 18, 20, 23A, 23B, 23C, and 23D.

Figure 30:
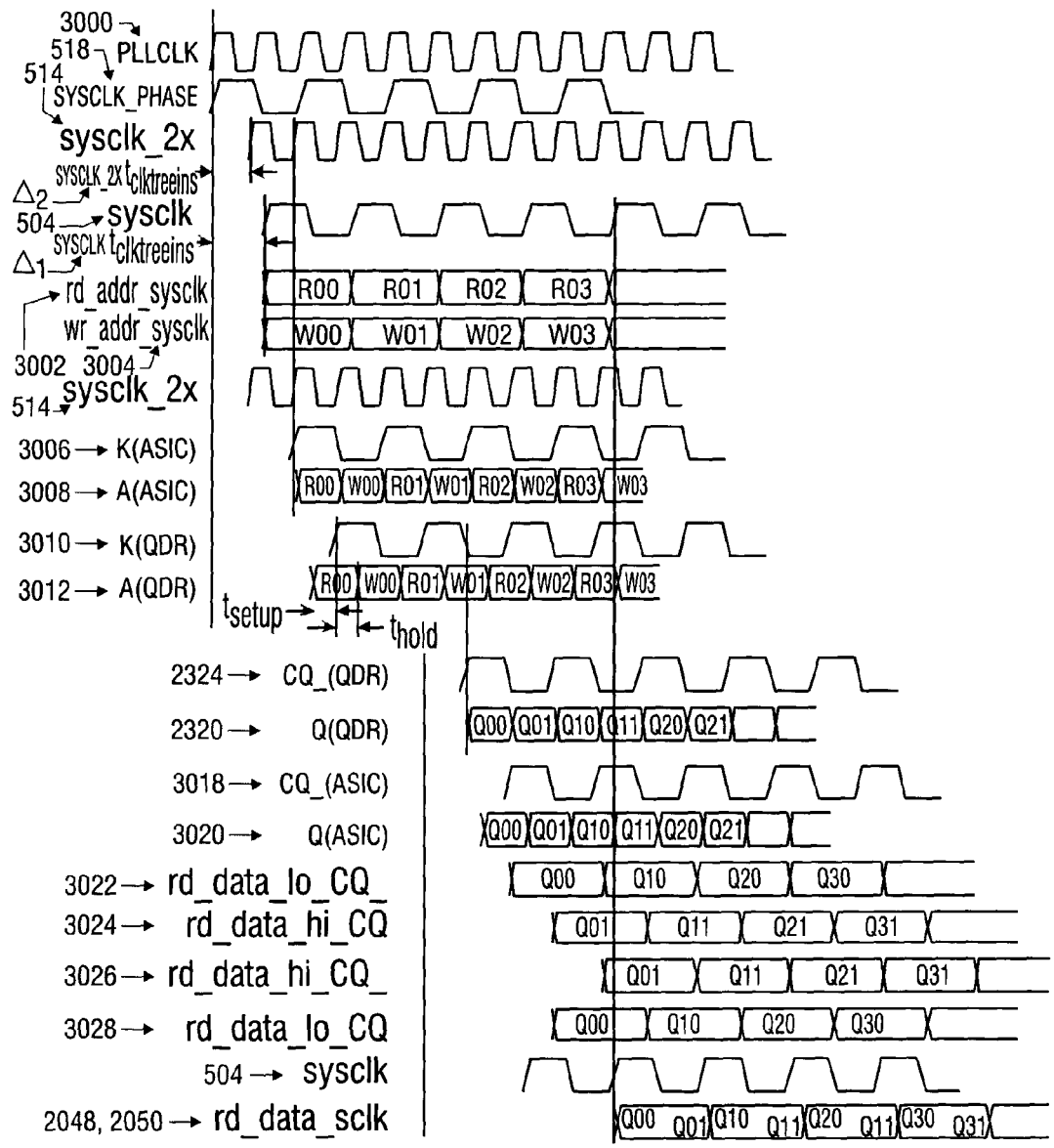
FIG. 30 is a timing diagram for the example implementation of FIGS. 23A–23D.

FIG. 30 is a timing diagram illustrating the operation of the example implementation of FIGS. 23A–23D. In FIG. 30, with a few exceptions which are addressed below, each waveform is identified with the corresponding identifying numeral of the signal in FIGS. 23A–23D represented by the waveform. These identified signals have already been explained, and need not be described further.

Numeral 3000 identifies the output of a phase locked loop (not shown in FIGS. 23A–23D) from which the second clock signal 514 is derived. The symbol $\Delta_2$ represents the delay introduced into the second clock signal 514 by the clock tree for that signal. The symbol $\Delta_1$ represents the delay introduced into the first clock 504 by the clock tree for that signal. Numeral 3002 identifies the latched read address, latched by flip-flops in block 2302 of FIG. 23A. Numeral 3004 identifies the latched write address, latched by flip-flops in block 2302 of FIG. 23A. Numeral 3006 identifies the K clock generated by block 1200 of FIG. 23B on the ASIC host side of the interface. Numeral 3008 identifies read and/or write address information synchronous with the K clock on the ASIC host side of the interface within block 512 of FIG. 23B. Numeral 3010 identifies the K clock on the SRAM side of the interface after being delayed by the 50Ω trace lines. Numeral 3012 identifies the read and/or write information on the SRAM side of the interface, again, after the delay introduced by the 50Ω trace lines.

Numeral 3018 identifies the CQ/ clock signal on the ASIC host side of the interface. This signal is used to clock flip-flops 1812 and 1814 in block 1800 of FIG. 23C. Numeral 3020 identifies read data from the SRAM on the ASIC host side of the interface. This data is the data input to flip-flops 1806 and 1812 in block 1800 of FIG. 23C.

Signal 3022 represents the low portion of the read data from the SRAM synchronous with CQ/ signal 3018. Signal 3024 represents the high portion of the read data synchronous with the CQ signal on the host ASIC side of the interface (not identified with a numeral in FIG. 23C). Signal 3026 represents the high portion of the read data synchronous with the CQ/ signal 3018. Signal 3028 represents the low portion of the read data synchronous with the CQ signal on the ASIC side of the interface.

Figure 25:
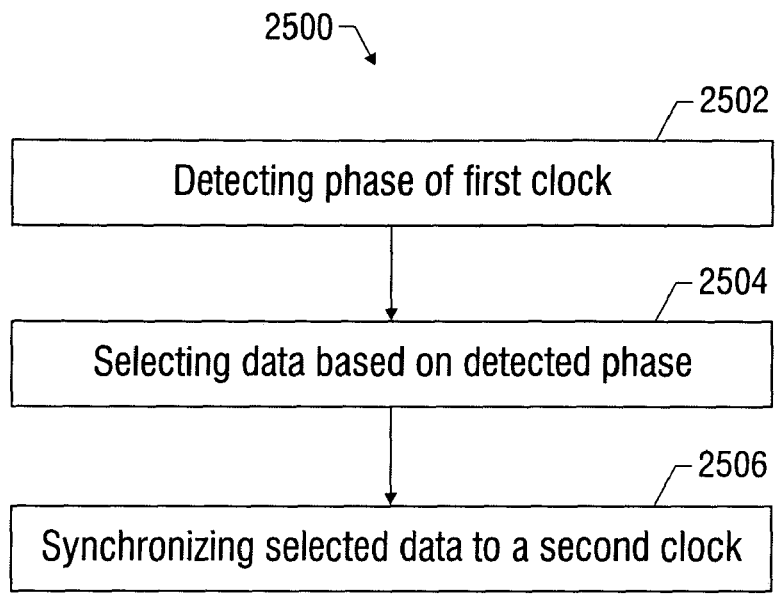
FIG. 25 is a flowchart of a method of selecting between first and second portions of data from a sender based on a detected phase of a first clock, and synchronizing the selected data to a second clock having a frequency which is an integer multiple of that of the first clock.

FIG. 25 is a flowchart illustrating one embodiment 2500 of a method of processing data for communication between a sender and a receiver. Step 2502 comprises detecting the phase of a first clock. Step 2504 comprises selecting a first portion of data from the sender if the detected phase of the first clock has a first polarity and selecting a second portion of data from the sender if the detected phase of the first clock has a second polarity. Step 2506 comprises synchronizing, for communication to the receiver, the selected data to a second clock having a frequency which is an integer multiple of that of the first clock, wherein the integer multiple is two or more.

The method may further comprise providing, for communication to the receiver, the first and second portions of the data at successive edges of the second clock having like polarity. It may also further comprise providing the first and second portions to the same output pins.

The method may also comprise deriving, responsive to the second clock, a third clock having a frequency equal to that of the first clock, and communicating to the receiver the first and second portions of the data and the third clock.

In one implementation, the method further comprises logically combining third and fourth portions of data from the sender responsive to a pre-determined mode selected from a plurality of possible modes, and synchronizing the logically combined data, for communication to the receiver, using the second clock. If the receiver comprises a configuration of one or more memories having a depth, one or the other of the third and fourth portions of data from the sender may be address data. The pre-determined mode may be an indicator of the depth of the memory configuration.

In one embodiment, the method further comprises switching between detecting first and second polarities of the phase of the first clock responsive to a pre-determined mode selected from a plurality of possible modes. The method may also comprise inverting the phase of the third clock responsive to a pre-determined mode selected from a plurality of possible modes, or disabling the third clock responsive to a pre-determined mode selected from a plurality of possible modes.

The method may further comprise engaging in a toggling mode in the phase detecting step once a phase lock condition has been achieved between the first and second clocks. In one embodiment, the method allows disabling the toggling mode responsive to a pre-determined mode selected from a plurality of possible modes.

It should also be appreciated that detecting step 2502 can be avoided in embodiments where the phase of the first clock is already known. Also, implementations are possible where the frequency of the second clock is an even or odd integer multiple of that of the first clock.

Figure 26:
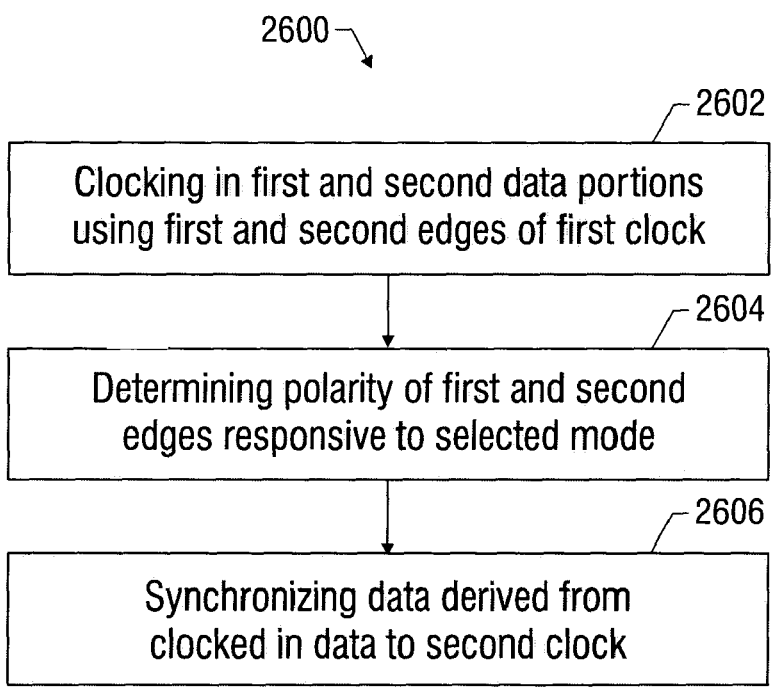
FIG. 26 is a flowchart of a method of clocking in first and second portions of data from a sender using first and second edges, respectively, of a first clock, determining the polarity of the first and second edges responsive to a selected mode, and then synchronizing the data to a second clock.

FIG. 26 is a flowchart of a second embodiment 2600 of a method of processing data for communication between a sender and receiver. Step 2602 comprises clocking in first and second portions of data from the sender using first and second edges, respectively, of a first clock. Step 2604 comprises determining the polarity of the first and second edges responsive to a pre-determined mode selected from a plurality of possible modes. In one implementation, the first and second edges are determined to have a first polarity if a first predetermined mode is in effect, and have a second polarity if a second predetermined mode is in effect. Step 2606 comprises synchronizing, for communication to the receiver, data derived from the clocked in data using a second clock.

In one implementation, the first clock is a differential mode signal. In this implementation, the first and second edges may be edges of like polarity from opposing polarity portions of the differential mode signal.

In one example, the first edge is from a first portion of the differential mode signal, and the second edge is from a second opposing polarity portion of the differential mode signal if the first pre-determined mode is in effect. If the second pre-determined mode is in effect, the first edge is from the second portion of the differential mode signal, and the second edge is from the first portion of the differential mode signal.

The first and second portions may be clocked in from the sender over the same one or more signal lines.

In one embodiment, the method further comprises transforming data clocked in by the first logic responsive to a pre-determined mode selected from a plurality of possible modes, and clocking out the transformed data. In one example, the transforming step comprises swapping the first and second portions of the data responsive to the pre-determined mode. In another example, the method comprises varying the latency of one or both of the first and second portions of the data responsive to the pre-determined mode. In this example, the latency of the first and second portions of the data may be independently varied responsive to the pre-determined mode.

Figure 27:
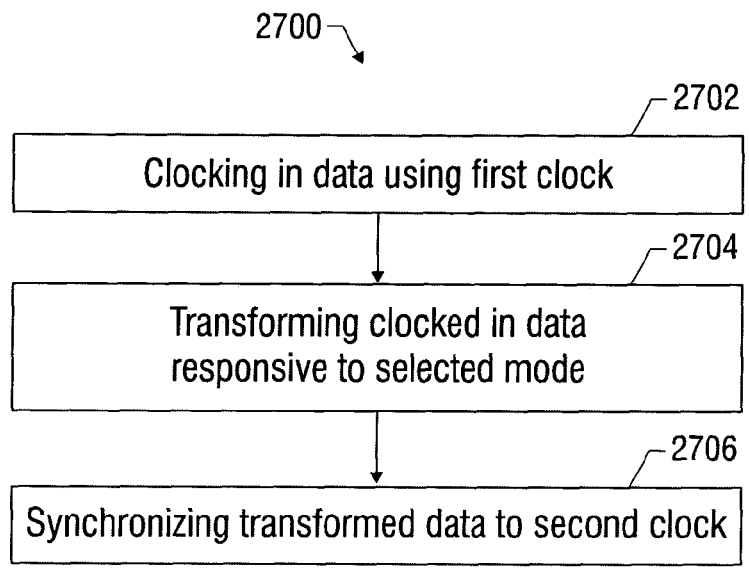
FIG. 27 is a flowchart of a method of clocking in data from a sender using a first clock, transforming the data responsive to a selected mode, and then synchronizing the transformed data to a second clock.

FIG. 27 is a flowchart of a third embodiment 2700 of a method of processing data for communication between a sender and receiver. Step 2702 comprises clocking in data from the sender using a first clock. Step 2704 comprises transforming at least a portion of the clocked in data responsive to a pre-determined mode selected from a plurality of possible modes. Step 2706 comprises synchronizing, for communication to the receiver, at least a portion of the transformed data using a second clock.

In one example, the clocked in data has first and second portions, and the method further comprises swapping the first and second portions responsive to the pre-determined mode.

In another example, the method further comprises varying the latency of at least a portion of the clocked in data responsive to the pre-determined mode. In the case in which the clocked in data has first and second portions, the method may further comprise varying the latency of one or both of the first and second portions responsive to the predetermined mode. The latency of the first and second portions may also be independently varied responsive to the pre-determined mode.

Figure 28:
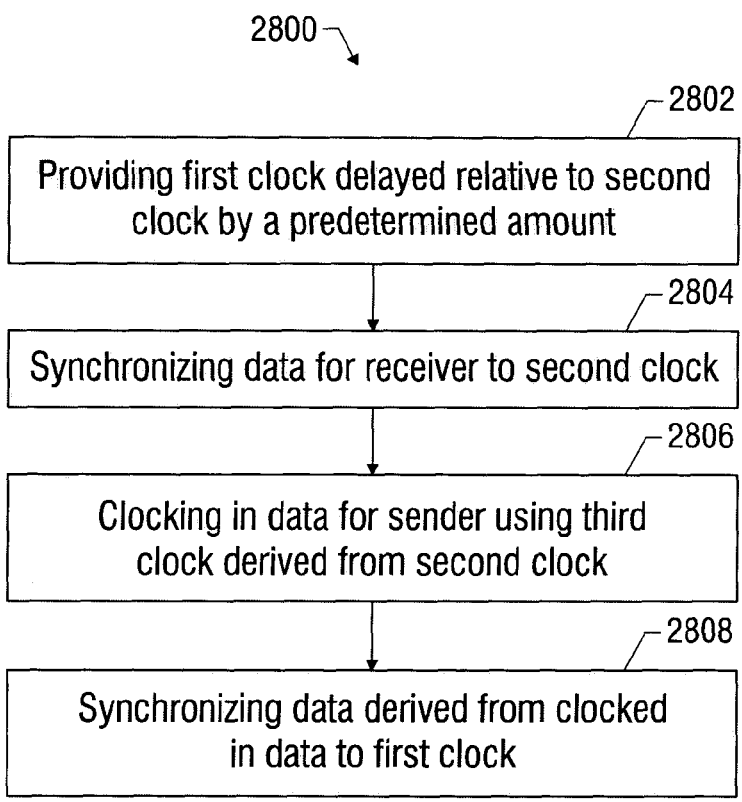
FIG. 28 is a flowchart of a method of providing a first clock delayed relative to a second clock by a pre-determined amount, clocking out data from a sender, for communication to a receiver, using the second clock, clocking in data from the receiver, for communication to the sender, using a third clock derived from the second clock, and synchronizing data derived from the clocked in data to the first clock.

FIG. 28 is a flowchart of a fourth embodiment 2800 of a method of processing data for communication between a sender and receiver. Step 2802 comprises providing a first clock delayed relative to a second clock by a pre-determined amount. Step 2804 comprises synchronizing, for communication to the receiver, data from the sender using the second clock. Step 2806 comprises clocking in, using a third clock derived from the second clock, data from the receiver. Step 2808 comprises synchronizing, for communication to the sender, data derived from the clocked in data using the first clock.

While various embodiments of the invention have been described, it will be apparent to those of ordinary skill in the art that many more embodiments and implementations are possible that are within the scope of this invention.

What is claimed is:

1. A system for processing data for communication between a sender and a receiver comprising:
    first logic for selecting a first portion of data from the sender if the phase of the first clock has a first polarity and selecting a second portion of data from the sender if the phase of the first clock has a second polarity; and
    second logic for synchronizing, for communication to the receiver, the selected first and second data portions to like polarity edges of a second clock aligned with the first clock and having a frequency which is an integer multiple of that of the first clock, wherein the integer multiple is two or more, thereby synchronizing the first and second portions to opposing polarity edges of the first clock.

2. The system of claim 1 further comprising third logic for detecting the phase of the first clock.

3. The system of claim 1 wherein the second logic is configured to synchronize the selected data to the second clock having a frequency which is an even integer multiple of that of the first clock.

4. The system of claim 1 wherein the second logic provides, for communication to the receiver, the first and second portions of the data on successive edges of the second clock having like polarity.

5. The system of claim 4 wherein the second logic provides the first and second portions to the same output pins.

6. The system of claim 1 further comprising third logic for deriving, responsive to the second clock, a third clock having a frequency equal to that of the first clock.

7. The system of claim 6 further comprising fourth logic for communicating to the receiver data from the third logic and the third clock.

8. The system of claim 1 further comprising third logic for logically combining third and fourth portions of data from the sender responsive to a pre-determined mode selected from a plurality of possible modes, and the second logic synchronizes the logically combined data, for communication to the receiver, using the second clock.

9. The system of claim 8 wherein the receiver comprises a configuration of one or more memories having a depth, one or the other of the third and fourth portions of data from the sender is address data, and the pre-determined mode is an indicator of the depth of the memory configuration.

10. The system of claim 2 wherein the third logic is configured to switch between detecting first and second polarities of the phase of the first clock responsive to a pre-determined mode selected from a plurality of possible modes.

11. The system of claim 6 wherein the third logic is configured to invert the phase of the third clock responsive to a pre-determined mode selected from a plurality of possible modes.

12. The system of claim 6 wherein the third logic is configured to disable the third clock responsive to a pre-determined mode selected from a plurality of possible modes.

13. The system of claim 2 wherein the third logic is configured to engage in a toggling mode once a phase lock condition has been achieved between the first and second clocks.

14. The system of claim 13 wherein the third logic is configured to disable the toggling mode responsive to a pre-determined mode selected from a plurality of possible modes.

15. A system for processing data for communication between a sender and receiver comprising:
    first logic for clocking in first and second portions of data from the sender using first and second edges, respectively, of a first clock, the first and second edges having a first polarity if a first pre-determined mode is in effect, and the first and second edges having a second polarity if a second pre-determined mode is in effect; and
    second logic for synchronizing, for communication to the receiver, data derived from the clocked in data using a second clock.

16. The system of claim 15 wherein the first clock is a differential mode signal.

17. The system of claim 16 wherein the first and second edges are edges of like polarity from opposing polarity portions of the differential mode signal.

18. The system of claim 17 wherein the first edge is from a first portion of the differential mode signal, and the second edge is from a second opposing polarity portion of the differential mode signal if the first pre-determined mode is in effect, and the first edge is from the second portion of the differential mode signal, and the second edge is from the first portion of the differential mode signal if the second pre-determined mode is in effect.

19. The system of claim 15 wherein the first and second portions are clocked in by the sender over the same one or more signal lines.

20. The system of claim 15 further comprising third logic for transforming data clocked in by the first logic responsive to a pre-determined mode selected from a plurality of possible modes, and providing the transformed data to the second logic.

21. The system of claim 20 wherein the third logic is configured to swap the first and second portions of the data responsive to the pre-determined mode.

22. The system of claim 20 wherein the third logic is configured to vary the latency of one or both of the first and second portions of the data responsive to the pre-determined mode.

23. The system of claim 22 wherein the third logic is configured to independently vary the latency of the first and second portions of the data responsive to the pre-determined mode.

24. A system for processing data for communication between a sender and receiver comprising:
   first logic for clocking in data from the sender using a first clock;
   second logic for transforming at least a portion of the clocked in data responsive to a pre-determined mode selected from a plurality of possible modes; and
   third logic for synchronizing, for communication to the receiver, at least a portion of the transformed data using a second clock.

25. The system of claim 24 wherein the clocked in data has first and second portions, and the second logic is configured to swap the first and second portions responsive to the pre-determined mode.

26. The system of claim 24 wherein the second logic is configured to vary the latency of at least a portion of the clocked in data responsive to the pre-determined mode.

27. The system of claim 26 wherein the clocked in data has first and second portions, and the second logic is configured to vary the latency of one or both of the first and second portions responsive to the pre-determined mode.

28. The system of claim 27 wherein the second logic is configured to independently vary the latency of the first and second portions responsive to the pre-determined mode.

29. A system for processing data for communication between a sender and receiver comprising:
   first logic for providing a first clock that is delayed relative to a second clock by a pre-determined amount;
   second logic for synchronizing, for communication to the receiver, data from the sender using the second clock;
   third logic for clocking in, using a third clock derived from the second clock, data from the receiver; and
   fourth logic for synchronizing, for communication to the sender, data derived from the clocked in data using the first clock,
   wherein the pre-determined amount is selected to reduce latency of the system.

30. A method of processing data for communication between a sender and a receiver comprising:
   selecting a first portion of data from the sender if the phase of the first clock has a first polarity and selecting a second portion of data from the sender if the phase of the first clock has a second polarity; and
   synchronizing, for communication to the receiver, the selected first and second data portions to like polarity edges of a second clock aligned with the first clock and having a frequency which is an integer multiple of that of the first clock, wherein the integer multiple is two or more, thereby synchronizing the first and second portions to opposing polarity edges of the first clock.

31. The method of claim 30 further comprising detecting the phase of the first clock.

32. The method of claim 30 wherein the synchronizing step comprises synchronizing the selected data using the second clock having a frequency which is an even integer multiple of that of the first clock.

33. The method of claim 30 further comprising providing, for communication to the receiver, the first and second portions of the data at successive edges of the second clock having like polarity.

34. The method of claim 33 further comprising providing the first and second portions to the same output pins.

35. The method of claim 30 further comprising deriving, responsive to the second clock, a third clock having a frequency equal to that of the first clock.

36. The method of claim 35 further comprising communicating to the receiver the first and second portions of the data and the third clock.

37. The method of claim 30 further comprising logically combining third and fourth portions of data from the sender responsive to a pre-determined mode selected from a plurality of possible modes, and synchronizing the logically combined data, for communication to the receiver, using the second clock.

38. The method of claim 37 wherein the receiver comprises a configuration of one or more memories having a depth, one or the other of the third and fourth portions of data from the sender is address data, and the pre-determined mode is an indicator of the depth of the memory configuration.

39. The method of claim 31 further comprising switching between detecting first and second polarities of the phase of the first clock responsive to a pre-determined mode selected from a plurality of possible modes.

40. The method of claim 35 further comprising inverting the phase of the third clock responsive to a pre-determined mode selected from a plurality of possible modes.

41. The method of claim 35 further comprising disabling the third clock responsive to a pre-determined mode selected from a plurality of possible modes.

42. The method of claim 31 further comprising engaging in a toggling mode in the phase detecting step once a phase lock condition has been achieved between the first and second clocks.

43. The method of claim 42 further comprising disabling the toggling mode responsive to a pre-determined mode selected from a plurality of possible modes.

44. A method of processing data for communication between a sender and receiver comprising:
   clocking in first and second portions of data from the sender using first and second edges, respectively, of a first clock, the first and second edges having a first polarity if a first pre-determined mode is in effect, and the first and second edges having a second polarity if a second pre-determined mode is in effect; and
   synchronizing, for communication to the receiver, data derived from the clocked in data using a second clock.

45. The method of claim 44 wherein the first clock is a differential mode signal.

46. The method of claim 45 wherein first and second edges are edges of like polarity from opposing polarity portions of the differential mode signal.

47. The method of claim 46 wherein the first edge is from a first portion of the differential mode signal, and the second edge is from a second opposing polarity portion of the differential mode signal if the first pre-determined mode is in effect, and the first edge is from the second portion of the differential mode signal, and the second edge is from the first portion of the differential mode signal, if the second pre-determined mode is in effect.

48. The method of claim 44 wherein the first and second portions are clocked in from the sender over the same one or more signal lines.

49. The method of claim 44 further comprising transforming data clocked in by the first logic responsive to a pre-determined mode selected from a plurality of possible modes, and clocking out the transformed data.

50. The method of claim 49 further comprising swapping the first and second portions of the data responsive to the pre-determined mode.

51. The method of claim 49 further comprising varying the latency of one or both of the first and second portions of the data responsive to the pre-determined mode.

52. The method of claim 51 further comprising independently varying the latency of the first and second portions of the data responsive to the pre-determined mode.

53. A method of processing data for communication between a sender and receiver comprising:
   clocking in data from the sender using a first clock;
   transforming at least a portion of the clocked in data responsive to a pre-determined mode selected from a plurality of possible modes; and
   synchronizing, for communication to the receiver, at least a portion of the transformed data using a second clock.

54. The method of claim 53 wherein the clocked in data has first and second portions, and the method further comprises swapping the first and second portions responsive to the pre-determined mode.

55. The method of claim 53 further comprising varying the latency of at least a portion of the clocked in data responsive to the pre-determined mode.

56. The method of claim 55 wherein the clocked in data has first and second portions, and the method further comprises varying the latency of one or both of the first and second portions responsive to the pre-determined mode.

57. The method of claim 56 further comprising independently varying the latency of the first and second portions responsive to the pre-determined mode.

58. A method of processing data for communication between a sender and receiver comprising:
   providing a first clock which is delayed relative to a second clock by a pre-determined amount;
   synchronizing, for communication to the receiver, data from the sender using the second clock;
   clocking in, using a third clock derived from the second clock, data from the receiver; and
   synchronizing, for communication to the sender, data derived from the clocked in data using the first clock,
   wherein the pre-determined amount is selected to reduce latency.

59. A system for processing data for communication between a sender and receiver comprising:
   means for selecting between first and second portions of data from the sender responsive to the phase of the first clock;
   means for synchronizing, for communication to the receiver, the selected data using a second clock having a frequency which is an integer multiple of that of the first frequency, wherein the integer multiple is two or more;
   means for delaying the first clock relative to the second clock; and
   means for deriving from the second clock a third clock for communication to the receiver.

60. The system of claim 59 further comprising means for detecting the phase of the first clock.

61. The system of claim 60 wherein the detecting means detects the phase of the first clock responsive to a pre-determined mode selected from a plurality of possible modes.

62. The system of claim 59 wherein the deriving means derives the third clock for communication to the receiver responsive to a pre-determined mode selected from a plurality of possible modes.

63. A system for processing data for communication between a sender and receiver comprising:
   means for clocking in first and second portions of data from the sender using first and second edges, respectively, of a first clock, the first and second edges having a first polarity if a first pre-determined mode is in effect, and the first and second edges having a second polarity if a second pre-determined mode is in effect;
   means for transforming at least a portion of the clocked in data responsive to a pre-determined mode selected from a plurality of possible modes; and
   means for synchronizing, for communication to the receiver, data derived from the clocked in data using a second clock.

* * * * *